(12) United States Patent
Angel et al.

(10) Patent No.: US 6,643,842 B2
(45) Date of Patent: *Nov. 4, 2003

(54) BYTE CODE INSTRUMENTATION

(75) Inventors: David J. Angel, Hudson, NH (US);
James R. Kumorek, Nashua, NH (US);
Farokh Morshed, Amherst, NH (US);
David A. Seidel, Peterborough, NH (US)

(73) Assignee: Compuware Corporation, Farmington Hills, MI (US)

(*) Notice: Subject to any disclaimer, the term of this patent is extended or adjusted under 35 U.S.C. 154(b) by 49 days.

This patent is subject to a terminal disclaimer.

(21) Appl. No.: 09/951,017

(22) Filed: Sep. 12, 2001

(65) Prior Publication Data

US 2002/0095661 A1 Jul. 18, 2002

Related U.S. Application Data

(63) Continuation of application No. 09/250,626, filed on Feb. 16, 1999, now Pat. No. 6,314,558, which is a continuation-in-part of application No. 09/066,988, filed on Apr. 23, 1998, now Pat. No. 6,186,677, which is a continuation-in-part of application No. 08/916,125, filed on Aug. 21, 1997, now Pat. No. 5,987,249

(60) Provisional application No. 60/045,018, filed on Apr. 28, 1997, provisional application No. 60/036,250, filed on Jan. 24, 1997, and provisional application No. 60/024,624, filed on Aug. 27, 1996.

(51) Int. Cl.⁷ ................................................. G06F 9/44
(52) U.S. Cl. .................. 717/130; 717/717; 717/127; 717/118; 714/35
(58) Field of Search ......................... 717/118, 127–130, 717/146; 714/35, 38, 45

(56) References Cited

U.S. PATENT DOCUMENTS

| | | | | |
|---|---|---|---|---|
| 4,667,290 A | * | 5/1987 | Goss et al. | 717/147 |
| 5,265,254 A | * | 11/1993 | Blasciak et al. | 717/130 |
| 5,297,284 A | * | 3/1994 | Jones et al. | 717/137 |
| 5,355,487 A | * | 10/1994 | Keller et al. | 717/127 |
| 5,432,795 A | * | 7/1995 | Robinson | 717/125 |
| 5,432,936 A | * | 7/1995 | Gray et al. | 717/169 |
| 5,487,158 A | * | 1/1996 | Amelina et al. | 717/136 |
| 5,528,753 A | * | 6/1996 | Fortin | 714/35 |
| 5,581,696 A | * | 12/1996 | Kolawa et al. | 714/38 |
| 5,617,569 A | * | 4/1997 | Gray et al. | 707/103 R |
| 5,628,017 A | * | 5/1997 | Kimmerly et al. | 717/127 |
| 5,790,858 A | * | 8/1998 | Vogel | 717/130 |
| 5,987,249 A | * | 11/1999 | Grossman et al. | 717/130 |
| 6,016,466 A | * | 1/2000 | Guinther et al. | 702/187 |
| 6,026,237 A | * | 2/2000 | Berry et al. | 717/130 |
| 6,186,677 B1 | * | 2/2001 | Angel et al. | 717/118 |
| 6,314,558 B1 | * | 11/2001 | Angel et al. | 717/118 |

OTHER PUBLICATIONS

IBM Technical Disclosure Bulletin, Memory Protection Software Facility for OS/2 Shared Data Applications, vol. No. 34, Issue No. 4A, Sep. 1991, 8 pages.*

* cited by examiner

*Primary Examiner*—Tuan Q. Dam
(74) *Attorney, Agent, or Firm*—Choate, Hall & Stewart

(57) ABSTRACT

Instrumenting a computer program to provide instrumented byte code includes examining the byte code, selecting portions of the byte code for instrumentation, and instrumenting the portions to provide instrumented byte code. Selecting the portions may include choosing portions of the byte code corresponding to method entry, method exit, a throw, a method call, or a new line number. Instrumenting a portion of the byte code corresponding to a method call may include instrumenting a local line number of source code corresponding to the byte code being instrumented. Instrumenting the portions may include adding calls to instrumentation runtime functions that pass parameters indicative of the portions being instrumented. At least one of the parameters that is passed may include a line number of the source code corresponding to the portion being instrumented or a this-pointer for the method corresponding to the portion being instrumented. Data from instrumentation may be passed via a message stream that is viewed as the data is being generated and/or stored.

41 Claims, 26 Drawing Sheets

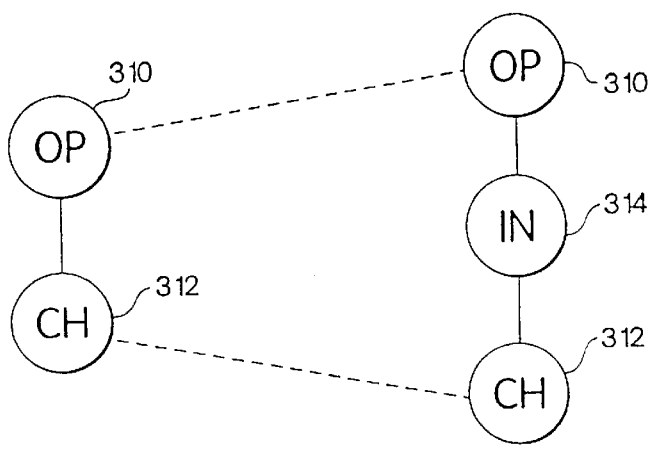
Fig. 11A
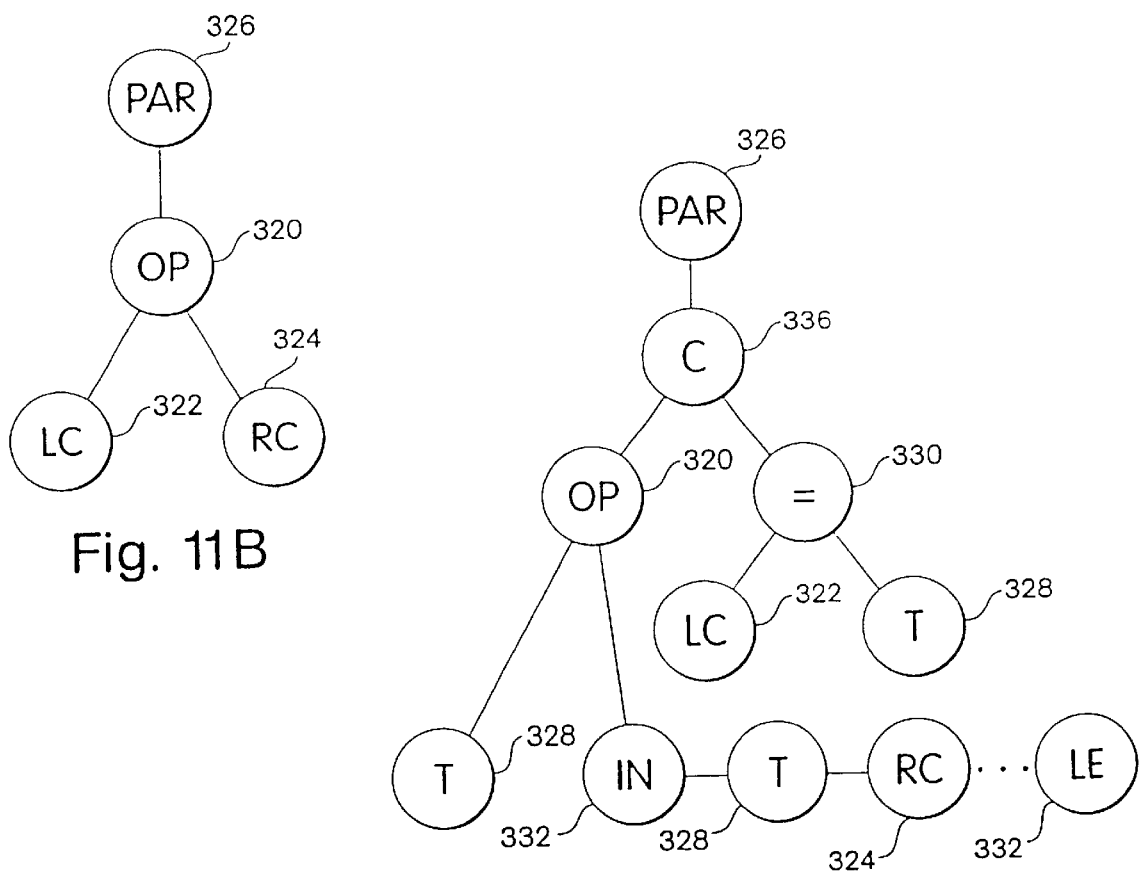
Fig. 11B
Fig. 11C

BYTE CODE INSTRUMENTATION

CROSS-REFERENCE TO RELATED APPLICATIONS

This application is a continuation of U.S. patent application Ser. No. 09/250,626. filed Feb. 16, 1999, now U.S. Pat. No. 6,314,558 B1. which is a continuation-in-part of U.S. patent application Ser. No. 09/066,988 filed on Apr. 23, 1998, now U.S. Pat. No. 6,186,677, which is based on U.S. Provisional Patent Application No. 60/045,018 filed on Apr. 28, 1997 and which is also a continuation-in-part of U.S. patent application Ser. No. 08/916,125, filed on Aug. 21, 1997, now U.S. Pat. No. 5,987,249, which is based on U.S. Provisional Patent Applications Nos. 60/024,624 and 60/036,250 filed on Aug. 27, 1996 and Jan. 24, 1997, respectively.

BACKGROUND OF THE INVENTION

1. Field of the Invention

This application relates to the field of computer software and more particularly to the field of computer software for instrumentation of code in order to facilitate debugging.

2. Description of Related Art

Code instrumentation is performed by adding statements to software in order to monitor performance and operation of the software during run time. Code instrumentation is sometimes used to facilitate debugging of run time errors relating to memory accesses. Specifically, since many run time errors are the result of improperly accessing or using memory (e.g., writing beyond an array's boundaries, not freeing dynamically allocated memory, etc.), then instrumentation may be used to supplement memory accessing portions of the software with additional software that monitors memory accesses and provides an indication when it appears that an improper access has occurred.

Instrumentation may be performed manually by having the programmer insert source code statements that intermittently output or record values related to memory variables, such as array indices and amounts of free space left in the allocation heap. However, such manual instrumentation is often inefficient for a number of reasons. Manual instrumentation requires the programmer to recognize possible sources of error in order to be able to insert the appropriate source code to perform the instrumentation. However, once the programmer has identified possible sources of error, it may be more straight-forward to simply examine the potentially errant code and fix the error rather than perform the additional steps associated with adding source code instrumentation statements. In addition, manually adding source code instrumentation statements requires repeated recompiling of the source code before execution, which adds time and effort to the debugging process. Also, the programmer must remember which statements are instrumentation statements in order to remove those statements once the added debugging statements are no longer needed.

Various systems exist for automating the debugging process. U.S. Pat. No. 5,581,696 to Kolawa et. al (the '696 patent) is directed to a method of using a computer for automatically instrumenting a computer program for dynamic debugging. In the system disclosed in the '696 patent, the instrumentation software examines and supplements a parse tree intermediate stage produced by the compiler. The parse tree is a tree having nodes corresponding to tokens that represent individual source code statements. The system described in the '696 patent traverses the parse tree to locate tokens of interest (e.g., tokens corresponding to memory accesses) and supplements those tokens with additional tokens corresponding to code that monitors the memory accesses. However, since the contents of the parse tree depend upon the particular source programming language used, the system disclosed in the '696 patent is also source dependent.

U.S. Pat. Nos. 5,193,180, 5,335,344, and 5,535,329, all to Hastings (the Hastings patents), disclose a system for instrumenting computer object code to detect memory access errors. The instrumentation includes providing additional code that maintains the status of each and every program memory location along with supplementing object code instructions that access the program memory with additional code that facilitates maintaining status of the memory locations. To the extent that the object code is independent of the particular source code that is used, the system disclosed in the Hastings patents is also independent of the source code language used.

However, since the system disclosed in the Hastings patents involves modifying object code, then the system is target dependent in that it may only be configured to work with object code that executes a particular target processor's native language. Although it may be desirable to adapt the Hastings system to work with object code for a variety of target processors, such an adaptation would require significant modifications to the system since object code instructions that access memory may vary significantly between different target processor languages. In addition, monitoring program memory accesses A by maintaining the status of program memory locations allows some improper operations to be performed by the software without being detected. For example, reading a memory location beyond an array's boundaries may not be detected if the memory location that is read has been allocated and initialized in connection with another memory variable.

Other systems for facilitating debugging exist. For example, U.S. Pat. No. 4,667,290 to Goss et al. is directed to compilers that create intermediate representation (IR) code that is both source and target independent. Column 5, lines 57–60 disclose using the IR code to facilitate debugging by retaining portions of the IR code that would otherwise be eliminated in the course of optimization if debugging is not being performed. Similarly, U.S. Pat. No. 5,175, 856 to Van Dyke et al. discloses a compiler that produces an IR code where debugging is facilitated by passing information through the intermediate code file.

U.S. Pat. Nos. 5,276,881, 5,280,613, and 5,339,419, all to Chan et al., disclose a compiler system that produces an IR code. U.S. Pat. No. 5,276,881 is illustrative of the three patents and discloses symbolic debugging support provided in connection with the compiler system described in the patent. Column 59, lines 15–19 indicate that if the symbolic debug option is specified, " . . . then the Low-level Code Generator 1322 writes additional information to the Low Level CIR 1338.". (CIR is an acronym for Compiler Intermediate Representation.) Column 57, lines 59–63 indicate that the Low-Level CIR 1338 is analogous to the compiler intermediate representation 212, but the low level CIR 1338 is not architecturally neutral (i.e., is target dependent). Column 57, lines 63–65 state specifically that the Low-Level CIR 1338 is dependent upon the particular architecture of the target computer platform.

In addition, various systems compile source code into an interpretive language, such as byte code. Ideally, the byte code is machine independent so that it may be run on a computer that uses an interpreter to perform the operations indicated by the byte code. The interpreter is, of course, machine dependent. However, once an interpreter has been provided for a particular machine, it only needs to be subsequently modified or updated when changes to the byte code standard occur.

Note that an interpreted byte code is, ideally, independent of the particular underlying source code. Thus one particular byte code could be used for multiple source code languages. An example of this is P-Code, which is an interpreted byte code that is provided by Fortran, C, and Pascal compilers. Thus, since a byte code may be both machine and source code independent, it would be advantageous to be able to instrument the byte code to provide instrumentation for a plurality of source code languages and a plurality of machines that all make use of the byte code.

SUMMARY OF THE INVENTION

According to the present invention, instrumenting a byte code computer program includes examining the byte code, selecting portions of the byte code for instrumentation, and instrumenting the portions to provide instrumented byte code. Selecting the portions may include choosing portions of the byte code corresponding to method entry, method exit, a throw, a method call, or a new line number. Instrumenting a portion of the byte code corresponding to a method call may include instrumenting a local line number of source code corresponding to the byte code being instrumented. Instrumenting the portions may include adding calls to instrumentation runtime functions that pass parameters indicative of the portions being instrumented. At least one of the parameters that is passed may include a line number of the source code corresponding to the portion being instrumented or a thispointer for the method corresponding to the portion being instrumented. As is known in the art, the thispointer is a pointer to an address where data for an object is stored.

At least one of the parameters that is passed may include at least one method parameter provided to a method containing byte code that is being instrumented. The at least one method parameter may be passed in a message buffer from an instrumentation runtime function to at least one viewer routine that displays the data to a user. The message buffer may include scalar data, array data, and object data. An object header or an array header may be placed in the message buffer. The message buffer may be limited to a predetermined size. The data indicative of the parameters may be stored in a message buffer. Data from the message buffer may be passed to at least one viewer routine that displays the data to a user.

A method may be instrumented to provide instrumentation for handling an abort. A native function call may be instrumented by adding a byte code wrapper to the native function and then instrumenting the wrapper. The wrapper may include byte code corresponding to method entry and exit portions. Instrumenting a call to a native function may include providing an native assembly language thunk that captures data passed to and from the native function. The assembly language thunk may be hooked between the virtual machine and the call to the native function. Hooking the assembly language thunk may include intercepting a call that provides an address for a procedure.

The data that is generated by instrumentation may be provided to a routine to pass data via a message stream. A data storage may be provided to store data provided via the message stream and/or a viewer may be provided to allow viewing at least a subset of data from the message stream as the data is being generated.

According further to the present invention, instrumenting a computer program includes examining an initial byte code representation of the program, creating a program counter mapping table corresponding to the byte code representation, selecting portions of the byte code representation for instrumentation using the program counter mapping table, instrumenting the portions by adding calls to instrumentation runtime functions at at least some of the portions, and modifying the program counter mapping table according to modifications to the byte code. According further to the present invention, uniquely identifying an object in an object oriented programming language includes obtaining a unique identifier, such as a hash code, corresponding to the object, creating a data structure having a least a first and a second storage location, storing an identifier for the object class in the first storage location, and storing the unique identifier in the second storage location.

BRIEF DESCRIPTION OF THE DRAWINGS

FIGS. 11A, 11B, and 11C illustrate insertion of nodes in connection with instrumentation of the tree data structure of FIG. 5.

DETAILED DESCRIPTION OF THE PREFERRED EMBODIMENT(S)

Figure 1:
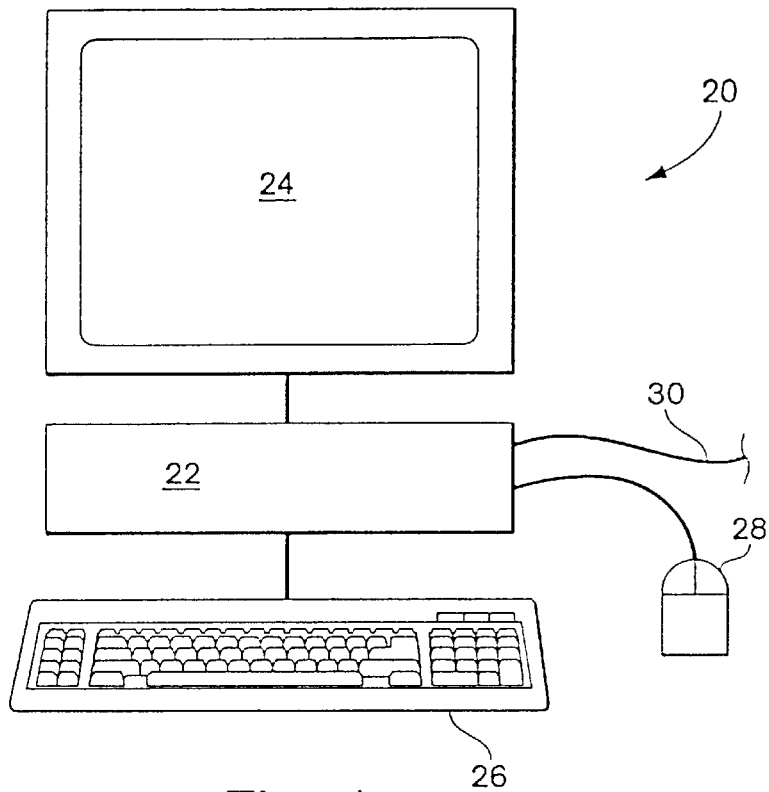
FIG. 1 shows a computer system that may be used to implement IR code instrumentation according to the present invention.

Referring to FIG. 1, a computer system 20 includes a processor 22, a display unit 24, a keyboard 26 and (optionally) a mouse input device 28. The user provides input to the processor 22 via the keyboard 26 and the mouse 28 and views output from the processor 22 via the display unit 24. The computer system may be a model P5-166 manufactured by Gateway Computer of Sioux City, S. Dak.

The computer system 20 may include a connection 30 to a conventional computer network (not shown), such as the Microsoft NT network. The computer system 20 may receive data and/or other network services, in a conventional manner, through the connection 30 to the network. The processor 22 may include conventional local storage or may use conventional storage available on the network wherein the processor 22 sends and receives data to and from the network via the network connection 30. The computer system 20 may use a combination of local storage and network storage in a conventional manner. In the discussion that follows, no specific reference is made to the type of storage device (i.e., local, network, or a combination thereof) since the system described herein does not depend on the type of computer data storage used.

Figure 2:
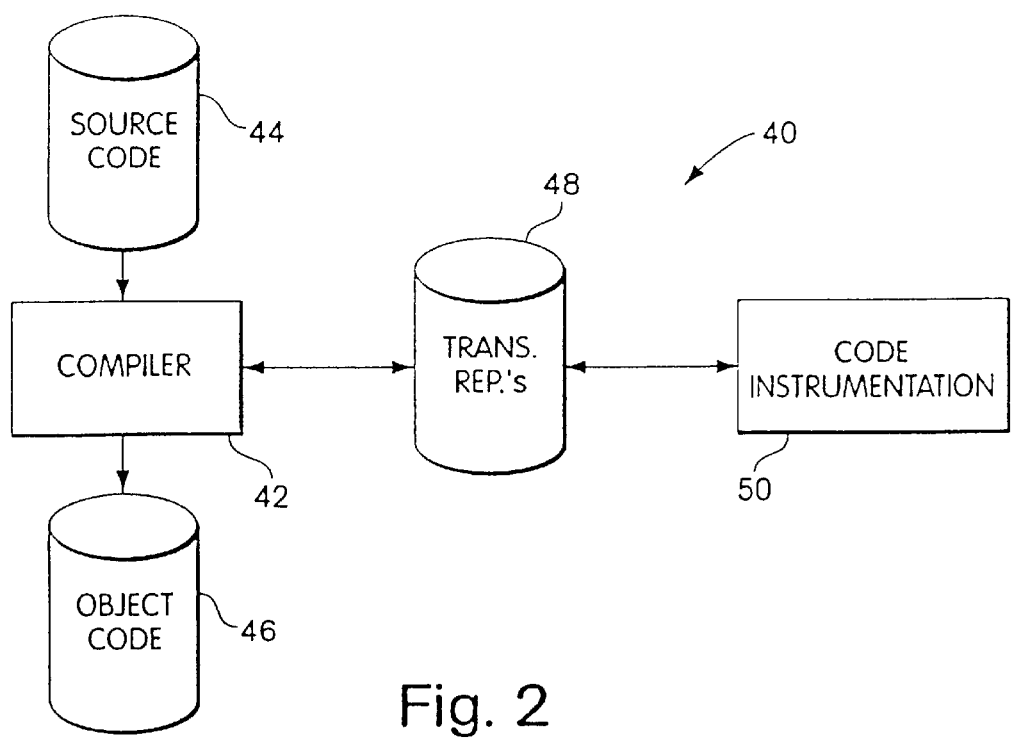
FIG. 2 is a data flow diagram illustrating a compiler operating in conjunction with IR code instrumentation according to the present invention.

Referring to FIG. 2, a data flow diagram 40, illustrates relationships between various executable code and data segments stored using the storage device of the processor 22. A software compiler 42 includes executable code that converts data representing computer source code 44 into data representing computer object code 46. The compiler 42 may be any one of a variety of conventional, commercially available, software compilers, such as the Microsoft C++ compiler manufactured by Microsoft Corporation of Redmond, Wash. If the compiler 42 is a C++ compiler, then the source code 42 represents C++ source code information entered by a user in a conventional manner such as, for example, entering the C++ source code statements into a text file in the computer system 20 using the keyboard 26 and mouse 28. The source code 44 may also be generated by any one of a variety of alternative techniques, such as other conventional, commercially available software that automatically generates the source code 44.

The object code 46 includes low-level code that is executable on a target processor (not shown). Accordingly, the object code 46 is target-specific. Note that the target processor may be the same type of processor as the processor 22 used in the computer system 20 or, alternatively, the target processor may be a different processor. The object code 46 is provided by the compiler 42 in a conventional manner.

In the course of compiling the source code 44 into object code 46, the compiler 42 may generate a plurality of transitional representations 48 that correspond to intermediate stages of the compile process. The transitional representations 48 may include a plurality of (usually temporary) data files that are created and accessed by the compiler 42. Each stage of the compiler 42 may access and/or create a particular one of the transitional representations that is provided by the previous stage of the compiler 42. Features of some of the transitional representations 48 are described in more detail hereinafter.

Code instrumentation software 50, that executes on the processor 22, accesses the transitional representations 48 and adds instrumentation instructions that ultimately provide instrumentation functionality to the object code 46. When the object code 46 is executed, the thus-added instrumentation functionality facilitates debugging in a manner described in more detail hereinafter.

Figure 3:
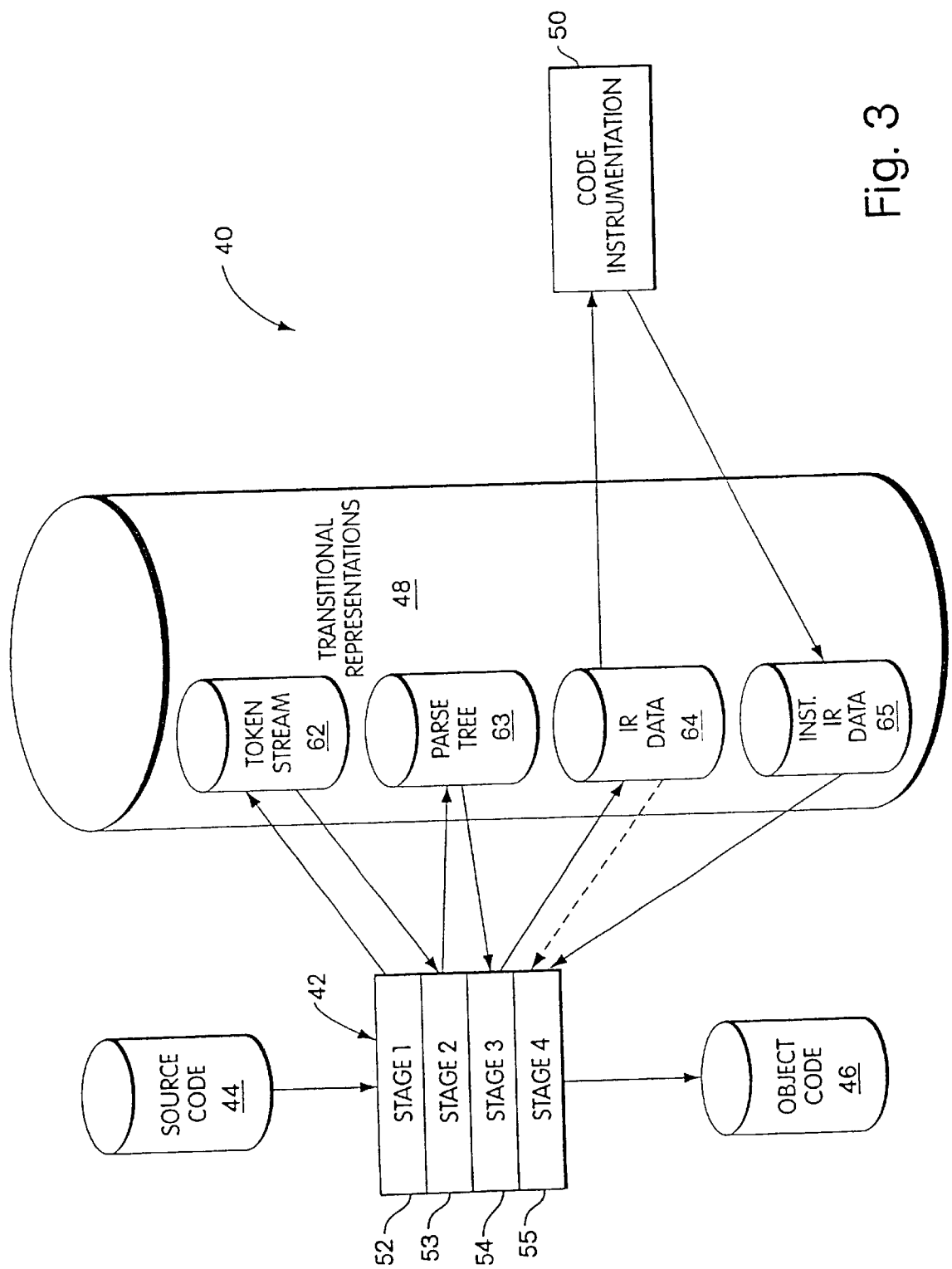
FIG. 3 is a data flow diagram illustrating interaction between various stages of the compiler and the IR code instrumentation according to the present invention.

Referring to FIG. 3, the data flow diagram 40 of FIG. 2 is illustrated with additional details included for the compiler 42 and for the transitional representation 48. The compiler 42 is shown herein as having four stages 52–55 that each perform a different phase in the process of transforming the source code 44 into the object code 46. The transitional representations 48 are shown as including various data elements that are created and/or accessed by the compiler 42. Note that other compilers may have more or less stages and that portions of the transitional representations 48 may be stored in a file, a computer memory, a combination thereof, or a variety of other means for maintaining computer data.

For the embodiment illustrated herein, the first stage 52 of the compiler 42 accesses the source code 44 and, in a conventional manner, converts the source code into tokens stored in a token stream data element 62. The token stream data element 62 contains symbols that represent individual source code statements. The symbols may be ordered according to the order of source code statements in the source code 44. The token stream 62 is provided to the second stage 53 of the compiler 42, which, in a conventional manner, converts the tokens from the token stream data element 62 into data stored in a parse tree data element 63. The parse tree data element 63 is a tree-like data structure that is constructed in a conventional manner using nodes corresponding to tokens from the token stream data element 62 that are interconnected in a directed graph according to entry and exit points of portions of the source code.

The parse tree data element 63 is provided to the third stage 54 of the compiler 42 which uses the data from the parse tree data element 63 to produce Intermediate Representation (IR) data that is stored in an IR data element 64. As described in more detail hereinafter, the IR data element 64 contains an intermediate representation of the program that is independent of the particular language used for the source code 44 and is also independent of the target processor on which the object code 46 will execute.

The fourth stage 55 of the compiler 42 converts IR data from the IR data element 64 into the object code 46. Without the code instrumentation unit 50, the fourth stage 55 of the compiler 42 could access the IR data element 64 (as indicated by the dashed line connecting the IR data element 64 to the fourth stage 55) and convert IR data from the IR data element 64 into the object code 46. However, in the system described herein, the IR data element 64 is provided to the code instrumentation 50 which, in a manner described in more detail below, instruments the IR data element 64 to provide an instrumented IR data element 65. In the system described herein, the fourth stage 55 of the compiler 42 accesses the instrumented IR data element 65 to provide the object code 46. Note that since the IR data element 64 and the instrumented IR data element 65 have the same basic structure, it is virtually transparent to the fourth stage 55 of the compiler 42 that the instrumented IR data element 65, instead of the IR data element 64, is being accessed to create the object code 46.

The IR data element 64 and the instrumented IR data element 65 contain conventional IR data that is both source and destination independent. The IR data represents the logical flow and operation of the program independent of the particular source code that is used in the source program to describe the logical flow and operation. In addition, the IR data is independent of the specific form of the object code (i.e., the specific target processor). Such IR data is well known in the prior art and will not be described in detail herein except as necessary to describe the invention.

Figure 4:
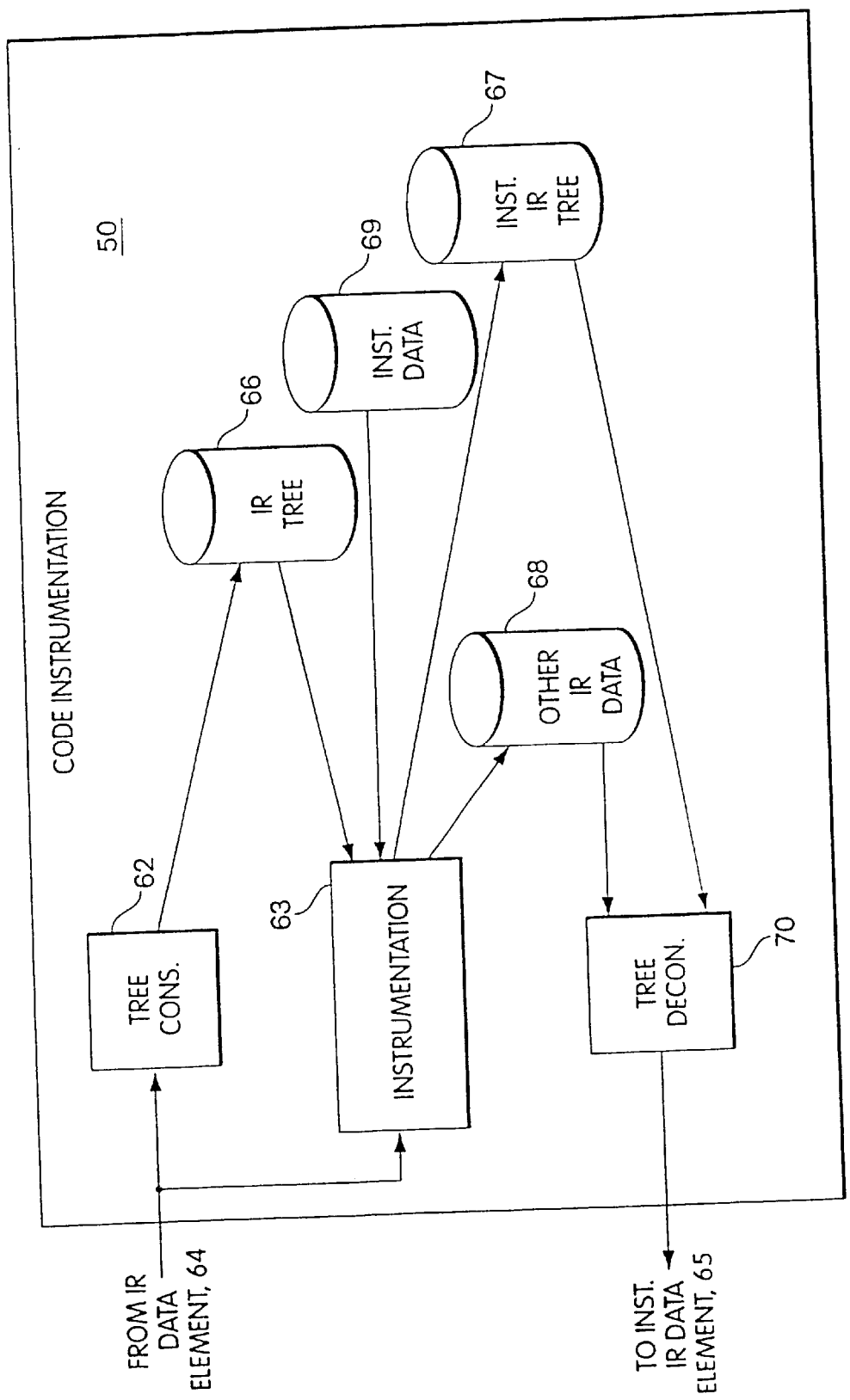
FIG. 4 is a data flow diagram illustrating in detail operation of the software for IR instrumentation.

Referring to FIG. 4, the code instrumentation 50 includes tree construction software 62 for constructing an IR tree, instrumentation software 63 for instrumenting both the IR tree and other IR data, and tree deconstruction software 70 for converting the thus-instrumented IR tree and other IR data into the instrumented IR data element 65. The tree construction software 62 receives input from the IR data element 64 and, in a manner described in more detail below, constructs an IR tree to provide to an IR tree data element 66. The instrumentation software 63 uses the IR tree data element 66 and other IR data from the IR data element 64 to provide an instrumented IR tree 67 and other IR data 68.

The instrumentation software 63 may also be provided with instrumentation data from an instrumentation data element 69. The instrumentation data element 69 may contain run time instrumentation routines and other IR data that is inserted by the instrumentation software 63 into the instrumented IR tree data element 67, the other IR data 68, or a combination thereof. The instrumentation software 63 and the instrumentation data element 69 are described in more detail hereinafter. The tree deconstruction software 70 uses the instrumented IR tree data element 67 and the other IR data 68 to create the instrumented IR data element 65. The tree deconstruction software 70 is described in more detail hereinafter.

The IR data consists of a plurality of operations and operands that correspond to the logic of the underlying source computer program. Note that the terms "operation" and "operand" may be defined broadly in this instance to include any type of statements found within IR data, including program transition statements such as call and goto, and static information such as line numbers. An operand can be a simple operand (e.g., a single variable or constant) or can be a complex operand (e.g., an expression) that corresponds to additional suboperations and operands. For example, IR data may indicate that the left side of an expression is to be set equal to the right side of an expression. The left side of the equation could be a single variable (i.e., a simple operand). The right side of the equation could also be simple operand (e.g., a constant) or could be a complex operand (e.g., an expression) that must be further evaluated in the context of additional operators and operands (e.g., addition of two variables).

Note that the IR data is both source language independent and target machine independent so that, for example, a source code statement written in a first source language could generate IR data that is identical to a programatically equivalent source language statement in a second source language if the underlying operations are identical. Similarly, a particular set of IR data can be converted by a compiler into many different object codes depending on the target machine. Although a specific IR representation may be particular to a specific compiler manufacturer, IR data and IR representations are generally known in the art. See, for example, a section titled "Graphical Representations" at pages 464–465 of Aho, Seth & Ullman, *Compilers, Principles, Techniques, and Tools,* published by Addison-Wesley of Reading Mass., 1986.

Figure 5:
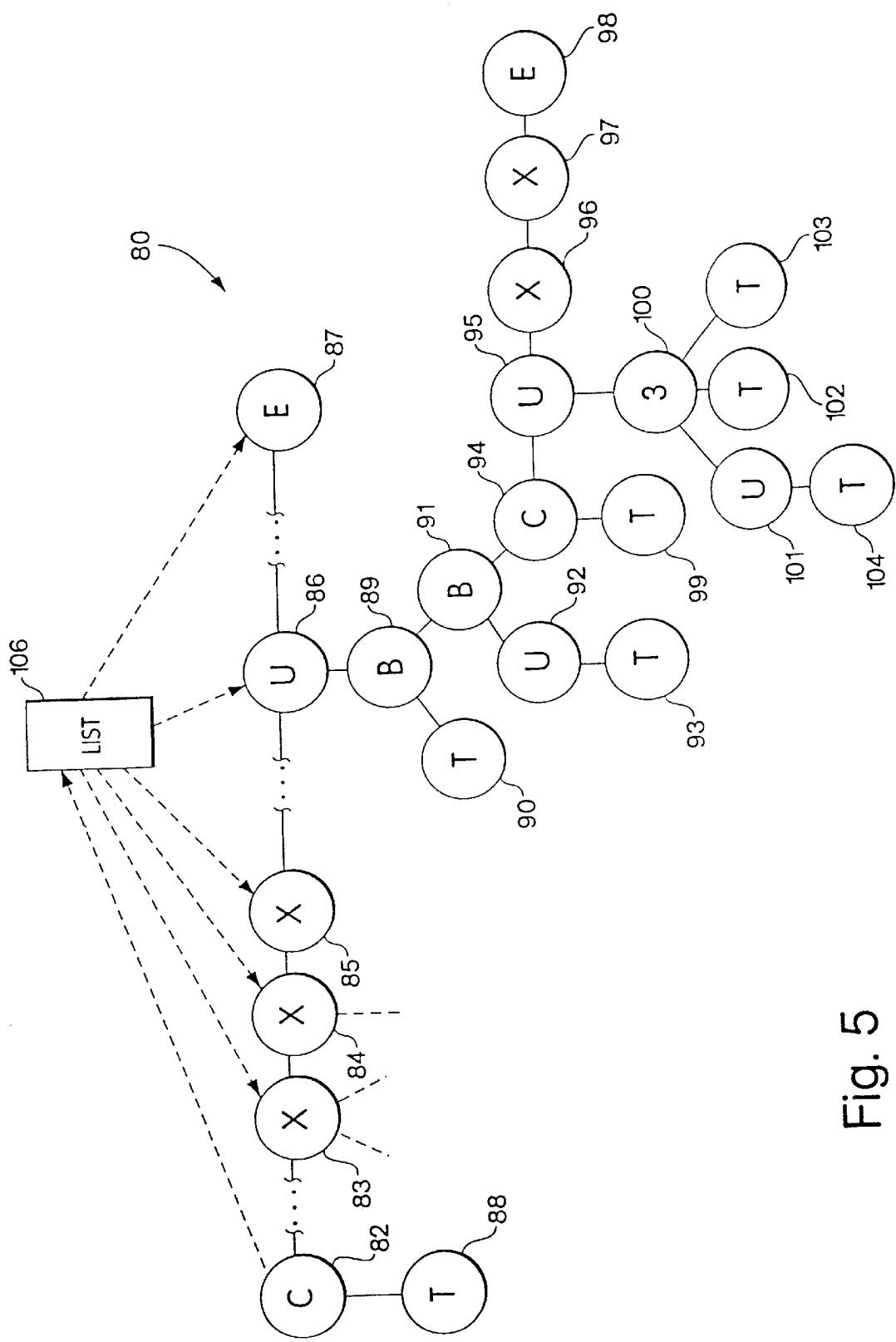
FIG. 5 illustrates a tree data structure corresponding IR code operators and operands.

Referring to FIG. 5, a tree 80 corresponds to the IR tree data element 66 provided by the tree construction software 62 shown in FIG. 4 and discussed above. The tree 80 includes a plurality of nodes 82–104. The nodes 82–104 have different types and are labeled according to type as follows:

T: terminal node
U: unary node
B: binary node
3: ternary node
C: combination node
E: end of list indicator node
X: indeterminate node, one of the above listed types of nodes The terminal nodes 88, 90, 93, 99, 102–104 are nodes of the tree 80 having no children. The unary nodes 86, 92, 95 have only one child. The binary nodes 89, 91 have two children. The ternary node 100 has three children. The combination nodes 82, 94 have two children wherein one of the children is a list terminated by the end of list nodes 87, 98. The indeterminate nodes 83–85, 96, 97 represent nodes that could be any one of the other types of nodes and have been included in the tree 80 to facilitate illustration of the structure of the tree 80.

Each of the nodes 82–104 represents an IR operation and/or an IR operand within the IR data. For any particular one of the nodes 82–104, the children thereof represent the operators and the operands used to evaluate the parent. For example, the binary node 89 could represent an operation having two operands corresponding to the two children of the binary node 89: the terminal node 90 and the binary node 91. The terminal node 90 does not have any children and thus may correspond to a simple operand (e.g., a constant). The binary node 91 is a complex operand having children (the unary node 92 and the combination node 94) which are evaluated in order to evaluate the complex operand represented by the binary node 91.

For the combination nodes 82, 94, the attached list elements are shown as being linked together so that, for example, the node 83 is shown being linked to the node 84 and the node 84 is shown as being linked to the node 85. Another possible way to construct the list is to have the combination node 82 point to a separate list data structure 106 that contains pointers to the remaining nodes 83–87 that represent elements of the list. In that case, there would be no need for the connections between members of the list so that the node 83 would not contain a pointer to the node 84, nor would the node 84 contain pointers to the nodes 83, 85, nor would the node 85 contain a pointer to the node 84. The advantage of such a construction is that none of the nodes 83–87 would use extra storage space for pointers to the peers thereof. Of course, separately constructing the list 106 may add complexity and possibly additional processor time in connection with manipulating the combination node 82. Note that irrespective of whether the list nodes 83–87 are connected peer to peer or are simply pointed to by the separate list 106, the end of list may conveniently be indicated by the end of list node 87.

The tree 80 illustrates that the underlying program corresponding to the IR data can be represented as a list of root nodes of a plurality of subtrees. That is, the program may be represented by a list of nodes 82–87 that correspond to root nodes of a plurality of subtrees. Of course, some of these subtrees may simply have a root node without substructure while other subtrees, such as the subtree emanating from the node 86, may have a more involved structure. Note also that, in some embodiments, the tree 80 may represent a single function among a plurality of functions contained in the IR data element 64.

Figure 6:
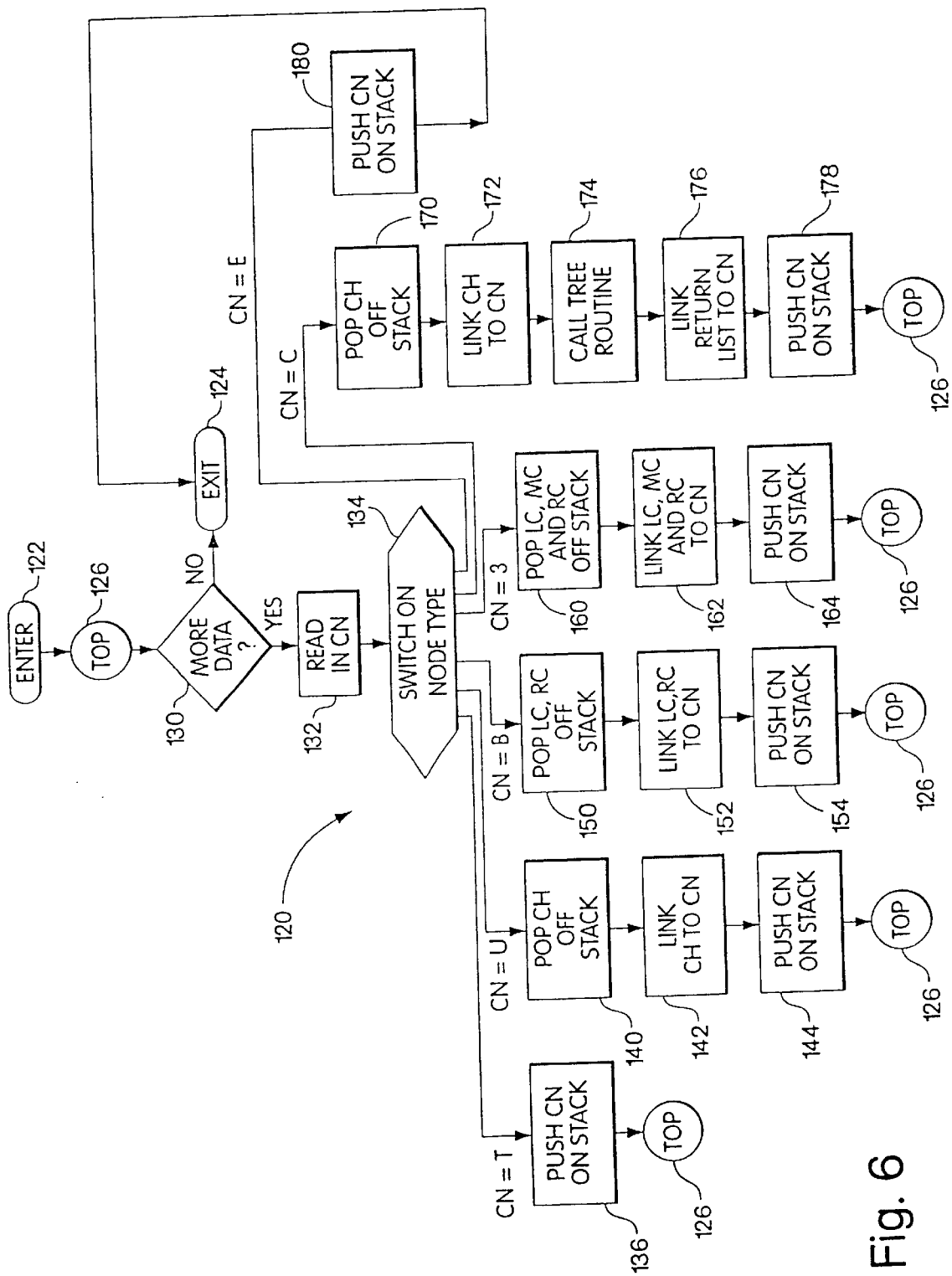
FIG. 6 is a flow chart illustrating steps used to construct the tree data structure of FIG. 5.

Referring to FIG. 6, a flowchart 120 illustrates operation of the tree construction software 62 of FIG. 4 that uses data from the IR data element 64 to provide the IR tree data element 66. The flowchart includes an entry point 122 and an exit point 124. A connector 126 labeled "TOP" is used to simplify the flowchart 120 by decreasing the number of flow lines thereon. All points on the flowchart labeled with the connector 126 represent the same logical point in the flow of the code.

The data that is read from the IR data element 64 and processed by the tree construction software 62 could be stored in a computer file. In other embodiments, data may be stored in computer memory or stored using any one of a variety of means sufficient for providing the IR data element 64. Each node may be represented by a variable length record having conventional type and size indicators. In the embodiment illustrated herein, it is assumed that the data is stored in a conventional computer file with the operands corresponding to a node being at an earlier point in the file than the node itself. For example, if a particular node representing the addition operation has two children representing the first and second operands that are being added, then the three nodes (parent and two children) may be stored in the file with the first and second operands being located sequentially prior to the node indicating the addition operation. Accordingly, for any tree or subtree, the root node may be located in the file following all of the children nodes. In a preferred embodiment, the data from the IR data element 64 is first read into a flat list (such as a linked list or an array). Then the flat list is processed to provide the tree 80. The nodes that are part of the flat list may be the same nodes stored in the tree 80 (i.e., the same data), with the tree 80 being constructed by simply adding links to the nodes in the flat list to form the tree 80. Alternatively, the flat list may be part of the IR data element 64.

Processing for the routine illustrated in FIG. 6 begins at a test step 130 which determines if there is more data to be processed. If not, then processing is complete and control passes to the exit point 124 to exit the tree construction software. Otherwise, control passes to a step 132 where the current node (CN) is read in. The CN represents the node that is processed by the remainder of the software. Note that if a separate flat list of nodes is used, then "reading in" CN may simply refer to examining the next node in the list. Otherwise, the CN may be read directly from the IR data element 64.

Following the step 132 is a step 134 where the node type of the CN is determined. Note that there are many conventional techniques known in the art for associating a type with a portion of data such as, for example, using a unique numeric code to differentiate between types. Once the node type is determined at the step 134, control passes to one of a plurality of code branches that process the particular node type.

If it is determined at the step 134 that the CN is a terminal node, then control passes from the step 134 to a step 136 where the CN is pushed onto a stack. As discussed in more detail below, the tree construction software 62 uses a local stack to construct the tree 80. Following with step 136, control passes back to the beginning of the routine (as indicated by the connector 126) to the steps 130, 132 (discussed above) that check to see if there is more data to be processed and, if so, then read that data into the CN.

If it is determined at the step 134 that the CN is a unary node (i.e., a node with one child), then control passes from the step 134 to a step 140 where the child (CH) of the unary node is popped off the local stack. Note that the child of the unary node would have been read in previously, per the convention adopted for storing the IR data, discussed above. Following the step 140 is a step 142 where the child of the unary node (i.e., the child of the CN) is linked to the CN. Following the step 142 is a step 144 where the CN is pushed onto the local stack. Note that the CN may be a child of another node that will be subsequently read in. Following the step 144, control passes back to the beginning of the routine, as indicated by the connector 126.

If it is determined at the step 134 that the CN is a binary node (i.e., a node having two children), then control passes from the step 134 to a step 150 where the left child (LC) and the right child (RC) of the CN are popped off the local stack. Following the step 150 is a step 152 where the left child and right child are linked to the CN. Following the step 152 is a step 154 where the CN is pushed onto the local stack. Following step 154, control transfers back to the beginning of the routine, as indicated by the connector 126.

If it is determined at the step 134 that the CN is a ternary node, then control transfers from the step 134 to a step 160 where the three children of the ternary node, the left child (LC), middle child (MC), and right child (RC), are popped off the local stack. Following the step 160 is a step 162 where the left child, middle child, and right child are linked to the CN. Following the step 162 is a step 164 where the CN is pushed onto the local stack. Following the step 164, control transfers back to the beginning of the routine, as indicated by the connector 126.

If it is determined at the step 134 that the CN is a combination node, then control transfers from the step 134 to a step 170 where the child node (CH) is popped off the local stack. As discussed above in connection with FIG. 5, a combination node has two children where the first child is a single node and the second child is a list of nodes. In terms of storage of the IR data associated with a combination node, the first child may be stored prior to the combination node but the second child (the list elements) may be stored immediately after the combination node. Note also that, as discussed above, the end of the list is indicated by an end of list node.

Following the step 170 is a step 172 where the child node is linked to the CN. Following the step 172 is a step 174 where the routine is recursively called to process the elements of the list to be attached to the CN. As discussed in detail below, the return from the recursive call to the routine occurs when the end of list indicator is reached. Also, by convention, the routine may return a list containing items remaining on the local stack used by the routine.

Following the step 174 is a step 176 where the list returned by the call to the routine at the step 174 is linked to the CN to become the attached list of the combination node. Note that the call to the routine at step 174 causes each of the elements of the list for the combination node to be processed and placed on the local stack. Accordingly, the list of local stack elements may be returned upon returning from the call to the routine at the step 174. Following the step 176 is a step 178 where the CN (i.e., the combination node) is pushed onto the stack. Following step 178, control passes back to the beginning of the routine, as indicated by the connector 126.

If it is determined at the step 134 that the CN is an end of list indicator node, then control passes from the step 134 to a step 180 where the CN is pushed onto the local stack. Following the step 180, control passes back to the step 124 to return from the routine. Note that, in many instances, the return from the routine at this point is a return from a previous recursive call to the routine that was made when the corresponding combination node (the parent for the current list) was first encountered, as described above in connection with the steps 174, 176.

As discussed above, the instrumentation software 63 shown in FIG. 4 operates on the IR tree data element 66 to provide the instrumented IR tree data element 67. The instrumentation software 63 also uses data from the other instrumentation data element 69 which, as discussed in detail below, includes a plurality of run time instrumentation routines that may be added to the IR tree to facilitate run time debugging. In addition, as discussed in more detail below, the instrumentation software 63 instruments other IR data to provide the other IR data element 68 that includes instrumented versions of IR data. Once the instrumentation software 63 has provided the instrumented IR tree data element 67, the tree deconstruction routine 70 uses the instrumented IR tree data element 67 and the other IR data element 68 to provide the instrumented IR data element 65.

Figure 7:
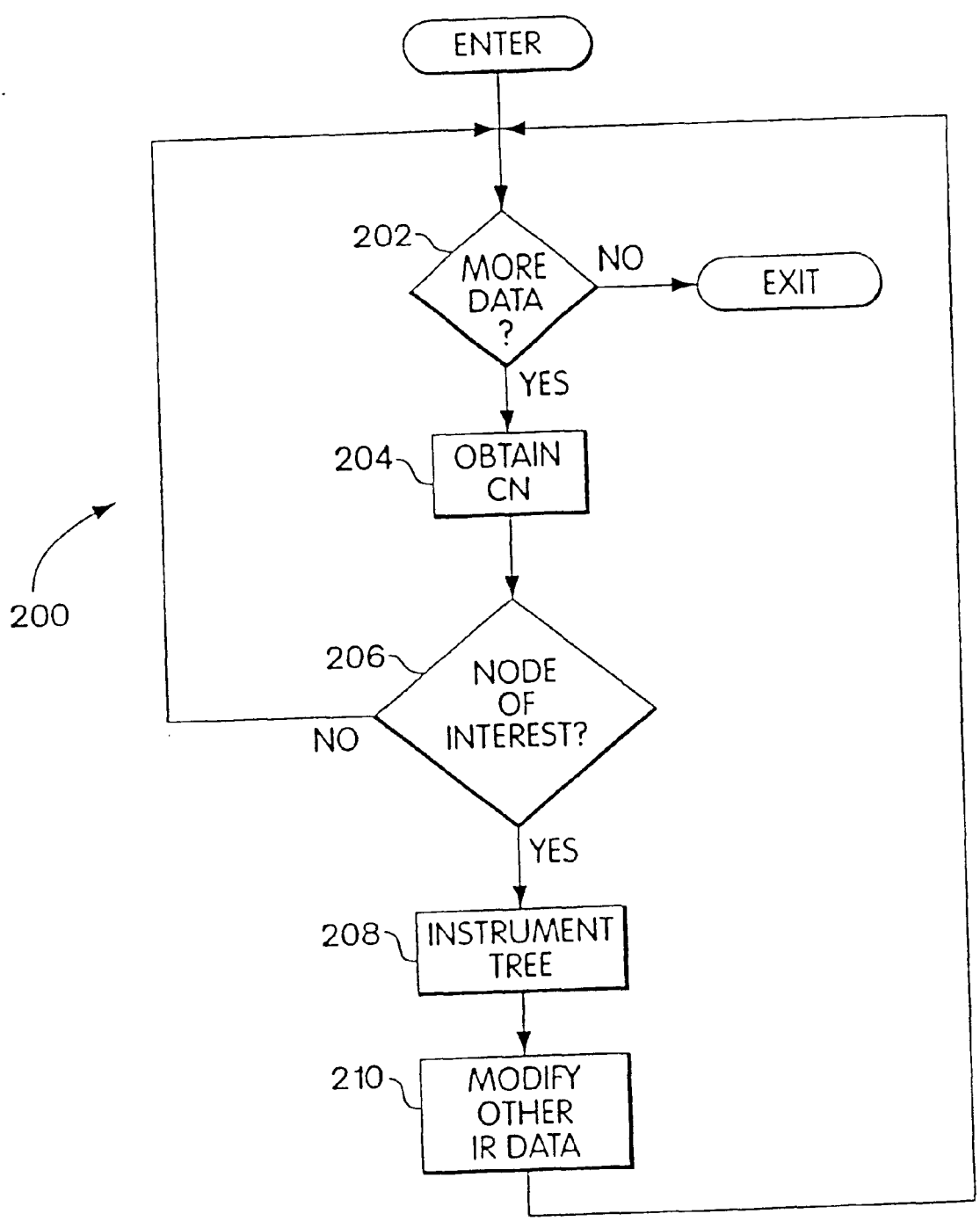
FIG. 7 is a flow chart illustrating instrumentation of the tree data structure of FIG. 5.

Referring to FIG. 7, a flowchart 200 illustrates operation of the instrumentation software 63 of FIG. 4. The instrumentation software 63 examines data found within the IR data element 64 and, in a manner discussed in more detail below, provides instrumentation. Processing begins at a test step 202 where it is determined if there is more data (i.e., more nodes) to examine. Note that the data that is processed could be either directly from the IR data element 64 or could be from the flat list of IR nodes, discussed above, that may be created in connection with creating the IR tree 80. If it is determined at the test step 202 that there is no more data to process (i.e., the end of the list or the end of the file containing the data has been reached), then processing is complete and the routine of FIG. 7 is exited.

If it is determined at the test step 202 that there is more data to be processed, then control passes from the test step 202 to a step 204 where the current node (CN) is obtained. In a manner similar to that discussed above in connection with construction of the IR tree 80, obtaining the CN may include reading the CN directly from the IR data element 64 or simply obtaining the next node in the flat list of nodes that may have been constructed prior to building the IR tree 80.

Following the step 204 is a test step 206 where it is determined if the CN is a node of interest. As discussed in more detail below, a node of interest includes any node that is to be instrumented or which indicates that instrumentation is appropriate. Identifying which nodes are nodes of interest at the test step 206 is discussed in more detail hereinafter.

If it is determined at the test step 206 that the CN is not a node of interest, then control passes from the test step 206 back up to the step 202 where it is determined if there is more data to be processed, as discussed above. Otherwise, if it is determined at the test step 206 that the CN is a node of interest, then control passes from the test step 206 to a step 208 where a portion of the IR tree 80 is instrumented, either by replacing the CN and/or adding additional nodes the near location of the CN in the tree 80. Following the step 208 is a step 210 where other IR data is modified, as appropriate. Following the step 210, control passes back to the step 202 to determine if there is more data to be processed.

Generally, it is possible to instrument any one or any subset of a variety of the nodes found in the IR tree 80. In many instances, however it is useful to instrument memory access instructions in order to detect illegal memory operations at run time. In addition, for many higher-level languages, variables that may be defined locally within a particular code block (such as a function) become undefined once that code block is exited. Accordingly, monitoring the variables of a program that access memory may necessitate monitoring exiting and entering blocks of code where variables become defined and undefined. For instance, a pointer variable may be defined within a particular block of code and used to allocate memory from the heap. If that block of code is exited before the memory is released, this would, in many instances, constitute an error since there would be no way to free the memory allocated using the (subsequently undefined) pointer variable.

In a preferred embodiment, the system described herein determines nodes of interest at the test step 206 by determining if the CN corresponds to one of: a pointer arithmetic operation that compares pointers or does pointer arithmetic, an operation that reads memory locations, an operation that changes memory locations, or an operation that causes variables to become defined or undefined, such as a scope change, a goto statement, a function call or a return from a function call. In the case of memory variable operations, whenever a variable is used to read memory, the run time instrumentation routines determine if the variable corresponds to memory that has been allocated and initialized. Similarly, if a variable is being used to write memory, the run time instrumentation routines determine if the variable corresponds to memory that has been allocated. Pointer comparisons are instrumented since it is often not proper to compare pointers that point to blocks of memory allocated by separate calls to the allocation routine(s). Operations that read or write to memory locations are instrumented to ensure that the memory variable(s) being used point to the memory allocated for the variable(s) during the read or write operation (e.g., an array index does not cause an access to an array to point beyond the end of the array).

Function calls and returns may be instrumented for a variety of purposes, including keeping track of variables becoming defined or undefined in connection with function calls and returns. In addition, note that it is possible to pass a variable pointer to a function and have that pointer be assigned to another variable within the function. These types of operations are instrumented since, even if a local variable is used to allocate memory, if that local variable corresponds to a passed variable, then it may not be improper to return from the function before freeing the memory allocated using the local variable.

Each block of code has a particular "scope" associated therewith. Transition from a block of code having one scope to a block of code having another scope is called a "scope change". One reason scope changing instructions are instrumented is to detect memory leaks (i.e., allocating memory that is not subsequently freed). As discussed above, it is an error to allocate memory to a local variable and then return or exit out of the scope which defines the local variable without first freeing the memory or copying a pointer for the memory to a variable that is not going out of scope. Another reason that scope changes are instrumented is to detect read accesses to unitialized variables. Note that associating blocks of code with particular scopes is known in the art. See, for example, a section titled "Representing Scope Information" at pages 438–440 of Aho, Seth & Ullman, *Compilers, Principles, Techniques, and Tools*, published by Addison-Wesley of Reading Mass., 1986.

One possible optimization is to not instrument scope changes that have minimal effect on monitoring variable operations. This optimization may be performed by first determining the scope of each portion of the IR code and then setting an effective scope of appropriate portions of the code to the effective scope of the immediately preceding block of code. In some instances, the block of code that immediately precedes the current block of code is the "parent" block of code. A preceding block of code is said to have a "preceding scope" relative to the current scope. For instance, in some higher level languages, a FOR loop will cause a scope change in connection with transition from the head of the loop to the body of the code that is executed within the loop. Thus, the scope of the head of the FOR loop is the preceding scope of the body of the FOR loop.

An effective scope table indicates the effective scope of each block of IR code. As discussed in more detail below, the effective scope of a portion of IR code is deemed to be the scope of that portion for purposes of instrumenting operations that use program variables. The effective scope table creates a mapping between the actual scope and the effective scope of blocks of the IR code.

Figure 8:
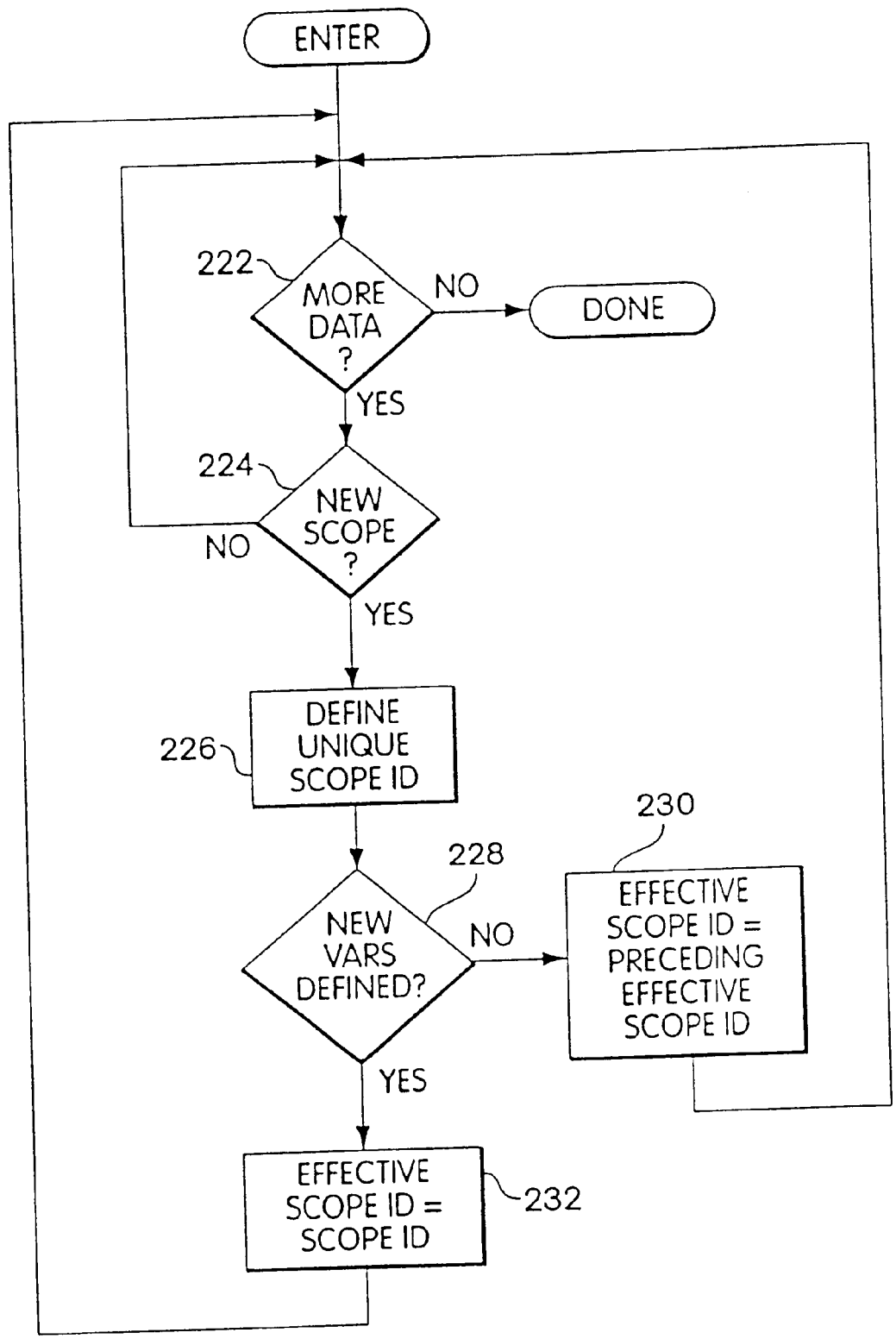
FIG. 8 is a flow chart illustrating construction of an effective scope table used in connection with instrumenting the tree data structure of FIG. 5.

Referring to FIG. 8, a flow chart 220 illustrates using the IR code to construct the effective scope table. Processing begins at a test step 222 which determines if there is more data to be processed, in a manner similar to that discussed above in connection with other processing. If it is determined at the test step 222 that there is no more data, then processing is complete. Otherwise, control passes from the test step 222 to a test step 224 which determines if the data that has been read in and is being processed indicates a scope change. Note that, depending on the specific IR implementation, a scope change may be indicated explicitly within the IR data or may be indicated implicitly, in which case the processing at the test step 224 would use conventional means for detecting a scope change, such as examining the data for the type of instructions that cause a scope change.

If it is determined at the test step 224 that there is no scope change, then control passes back to the test step 222 to determine if there is more data to be processed. Otherwise, if a scope change is detected at the test step 224, then control passes from the step 224 to a step 226 where a unique scope identifier is defined and assigned to the code block being processed. Construction of the effective scope table includes providing a unique scope identifier for each block of IR code having the same scope. Accordingly, one of the entries in the effective scope table is the unique scope identifier associated with each of the IR code blocks.

Following the step 226 is a test step 228 which determines if new variables are being defined within the block of code corresponding to the current scope. The variable definitions may be stored in the IR tree 80 or may be stored elsewhere, depending upon the specific implementation of the IR. If no new variables are defined within the current scope, then, for purposes of instrumenting memory variable accesses, it is not necessary to instrument the scope change. Accordingly, if it is determined at the test step 228 that no new variables are defined within the block of code corresponding to the current scope, then control passes from the step 228 to a step 230 where the effective scope of the current block of code is set equal to the effective scope of to the preceding block of code by associating the effective scope of the preceding block with the current scope. Note that setting the effective scope of the current block of code to the effective scope of the preceding block of code indicates that the scope change from the preceding block of code to the current block of code is not especially significant for purposes of instrumenting variable accesses. Note also that the effective scope of a preceding block may have been previously set to the effective scope of the preceding block of the preceding block. In this way, many scopes may be set to the same effective scope.

If it is determined at the test step 228 that new variables are defined within the current block of IR code, then control passes from the step 228 to a step 232 where the effective scope table is modified to indicate that the effective scope of the current block of code is equal to the actual scope assigned to that block of code. Following either the step 230 or the step 232, control passes back to the beginning of the routine. The thus-constructed effective scope table may be used to provide instrumentation optimizations, as discussed below.

Figure 9A:
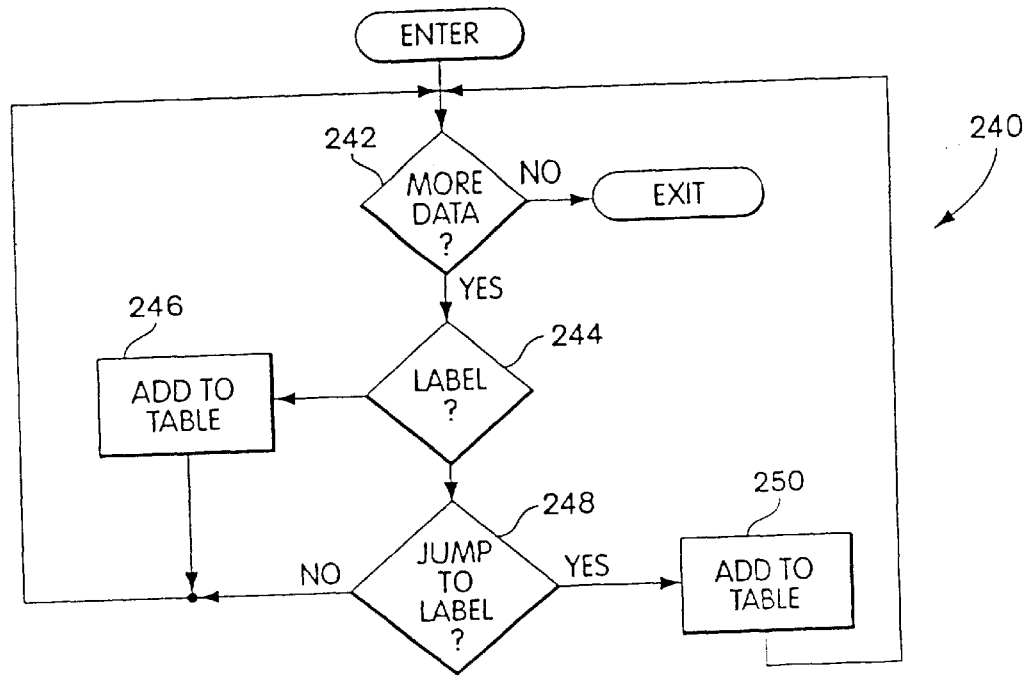
FIGS. 9A and 9B are flow charts illustrating scope optimization used in connection with instrumenting the tree data structure of FIG. 5.

Referring to FIG. 9A, a flow chart 240 illustrates code for identifying labels and jumps to labels within the IR code. Note that, in many conventional IR implementations, symbolic labels are used to identify locations within the code so that control flow instructions within the IR code may jump to those labels. In some instances, a jump to a label could cause a scope change and, therefore, could be instrumented if the jump causes program variables to become defined or become undefined. However, a possible optimization includes identifying labels that do not require instrumentation either because there are no jumps to those labels or because all jumps to those labels are from code having the same effective scope as the code corresponding to the label.

Processing begins at a test step 242 which determines if there is more data to be processed in a manner similar to that discussed above. If there is no more data, then processing is complete. Otherwise, control passes from the test step 242 to a test step 244 which determines if the current IR node being processed is a label for a block of IR code. If so, then control passes from the test step 244 to a step 246 where the label is added to a label table that is used by follow on processing, as discussed in more detail below.

If it is determined at the test step 244 that the data being processed is not a label, then control passes from the step 244 to a test step 248 which determines if the current data being processed includes IR code that jumps to a label. If not, then control passes from the test step 248 back to the step 242 to process additional data. Otherwise, if it is determined at the test step 248 that the current data being processed includes IR code that jumps to a label, then control passes from the step 248 to a step 250, where an entry is made to the label table. Following the step 250, control passes back to the beginning of the routine to process additional data. The processing illustrated in the flowchart 240 creates the label table to identify all labels and all jumps to labels within the IR code. Note that the term "table", as used herein, should be understood in its broader sense to include other equivalent data structures such as linked lists, storage in a temporary file, etc., familiar to one of ordinary skill in the art.

Figure 9B:
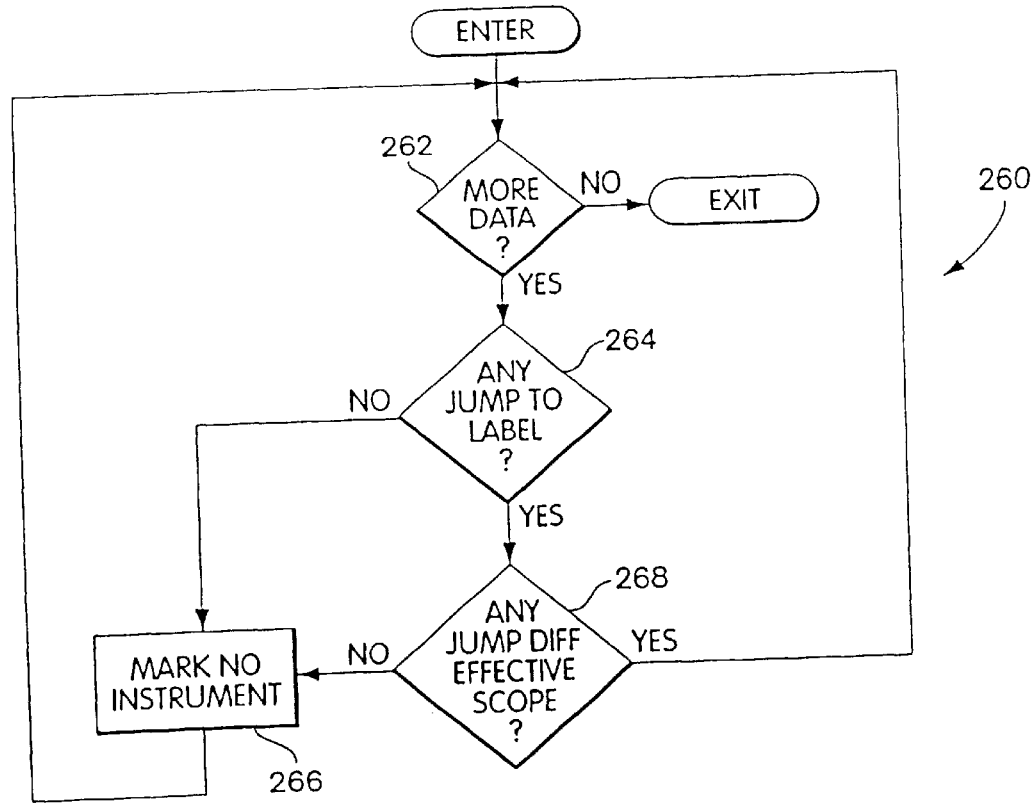

Referring to FIG. 9B, a flow chart 260 illustrates optimization operations that use the label table. Each label that is identified in the label table is examined to determine if there are any jumps to that label or if any of the jumps to the label are from IR code blocks having a different effective scope. Processing begins at a test step 262 which, in a manner similar to that discussed above, determines if there is more data to be processed. Note that, in this instance, the test for more data at the test step 262 is directed to processing each of the label entries in the label table.

If it is determined at the step 262 that there is no more data (i.e., there are no more labels to be processed), then processing is complete. Otherwise, if there are more labels to be processed, then control passes from the test step 262 to a test step 264 which examines the label table to determine if there are any jumps to the current label being processed. Note that, generally, it is possible for the compiler to generate IR code having labels that are ultimately not used (i.e., there is no IR code that jumps to the labels). Accordingly, if such labels exist, they are detected at the test step 264 and control passes to a step 266 where the label is marked (in a conventional manner) to indicate that the label is not to be instrumented. Following the step 266, control passes back to the beginning of the routine.

If on the other hand, it is determined at the test step 264 that there are jumps to the label being processed, then control passes from the step 264 to a test step 268 where it is determined if any of the jumps to the label are from IR code having a different effective scope than that of the label. Note that at the steps 246, 250 of FIG. 9A, the label table entries may be made to include the effective scope (from the effective scope table) of IR code corresponding to the labels and the jumps to the labels. Accordingly, at the step 268, the effective scope of the IR code corresponding to the label is compared with the effective scopes of all of the code containing jumps to the label. If it is determined at the step 268 that none of the jumps to the label are from IR code having a different effective scope than the code associated with the label, then control passes from the step 268 to the step 266, where the label is marked to indicate that the label is not to be instrumented, Since the effective scope tracks variables becoming defined and undefined within a code block and between different code blocks, then marking certain labels at the step 266 provides a worthwhile optimization when instrumenting code in connection with run time variable accesses.

If it is determined at the step 268 that there are jumps to the label that cause a change in effective scope, then control passes from the test step 268 back to the beginning of the routine. Once all the labels have been thus marked, it is possible to perform the remainder of the processing indicated by the step 206 in FIG. 7 where the nodes of interest are identified for subsequent instrumentation. Note that it is possible to use a boolean variable to indicate whether a label node is to be instrumented.

Figure 10:
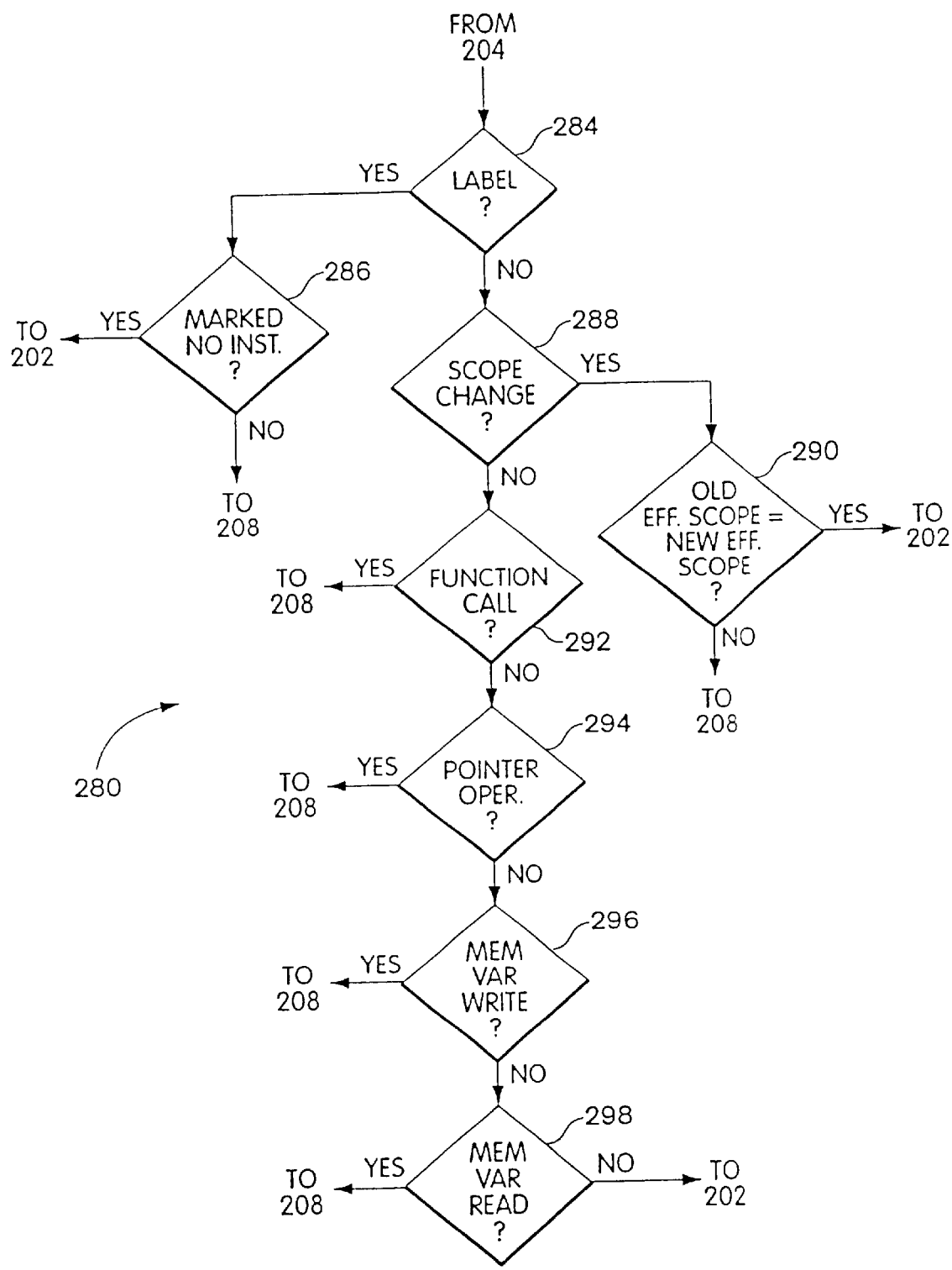
FIG. 10 is a flow chart illustrating in detail a portion of the flow chart of FIG. 7 where nodes are selected for instrumentation.

Referring to FIG. 10, a flowchart 280 illustrates a portion of the processing at the step 206 of FIG. 7 that determines which nodes in the IR code are to be instrumented. Processing begins at a test step 284, which is reached from the step 204 of FIG. 7. At the test step 284, it is determined if the data being processed corresponds to a label in the IR code. If so, then control passes from the test step 284 to a test step 286 to determine if the label has been marked to indicate that the label is not to be instrumented, as discussed above in connection with FIGS. 9A and 9B. If it is determined at the test step 286 that the label being processed has been marked to indicate that the label is not to be instrumented then control passes from the test step 286 to the step 202 of FIG. 7. Otherwise, if it is determined that the test step 286 that the label is to be instrumented, then control passes from the step 286 to the step 208 of FIG. 7 where the IR tree 80 is instrumented.

If it is determined at the test step 284 that the data being processed is not a label, then control passes from the step 284 to a step 288 where it is determined if the data being processed indicates a scope change. If so, then control passes from the step 288 to a test step 290 to determine if the old effective scope (i.e., the effective scope before the scope change) equals the new effective scope (i.e., the effective scope after the scope change). The effective scope is discussed above in connection with construction of the effective scope table. If it is determined that the scope changed detected at the test step 288 does not cause a change in the effective scope, then control passes from the test step 290 to the step 202 of FIG. 7. Otherwise, if it is determined at the test step 290 that the old effective scope does not equal the new effective scope, then control passes from the step 290 to the step 208 of FIG. 7 where the tree 80 is instrumented.

If it is determined at the step 288 that the data being processed does not cause a scope change, then control passes from the step 288 to a test step 292 where is determined if the data being processed is a function call. If so, then control passes from the test step 292 to the step 208 of FIG. 7. Otherwise, control passes from the test step 292 to a test step 294 which determines if the data being processed is a pointer operation. If so, then control passes from the test step 294 to the step 208 of FIG. 7. Otherwise, control passes from the test step 294 to a test step 296 where it is determined if the data being processed is a memory write operation (i.e. an operation with a program variable causing a write to memory). If so, then control passes from the test step 296 to the step 208 of FIG. 7. Otherwise, control passes from the step 296 to a test step 298 which determines if the data being processed relates to a memory read (i.e., is an operation with a program variable causing a read from memory). If so, then control passes from the test step 298 to the step 208 of FIG. 7. Otherwise, control transfers from the step 298 to the step 202 of FIG. 7.

FIG. 10 illustrates an embodiment of the invention where the instructions being instrumented relate to memory variable accesses and scope changes. In other embodiments of the invention, it is possible to instrument other types of IR instructions, depending upon which instructions are deemed appropriate for monitoring program operation at run time. For example, it may be possible to add instrumentation to monitor run time performance of the program. Other examples of possible uses of instrumentation include, but are not limited to, code coverage analysis and run time error handling.

Instrumenting memory variable accesses and scope changes, as disclosed herein, facilitates uncovering program errors relating to memory read and write operations that occurred during run time. Note that the specific IR operations, and the arguments thereof, vary depending upon the particular implementation of the IR. In addition, as discussed above, the choice of which operations to instrument varies depending upon the needs of the user of the instrumentation program.

The step 208 of instrumenting the IR tree, which is shown as FIG. 7, involves adding nodes to the tree that assist in the performance of the run time instrumentation. As discussed in more detail below, each of the specific run time instrumentation routines that is provided may include a function that is called to perform the instrumentation operation. Note that the instrumentation calls are added in a way that has no net effect on the underlying, uninstrumented, program. That is, the behavior of the IR code with the run time instrumentation routines added thereto has to be the same as the behavior of the original IR code without the instrumentation routines added. Thus, the instrumentation routines may add new variables, but do not change any of the program variables except in instances where the value of a program variable is undefined. The additional nodes, instrumentation function calls, etc. may be provided by the instrumentation data element 69 shown in FIG. 4.

Referring to FIG. 11A, a portion of an IR tree is shown containing a unary operation node 310 and a child node 312 thereof. The operation node 310 represents a node of interest that is to be instrumented. The child node 312 represents the sole child of the operation node 310. In order to instrument the operation node 310, a run time instrumentation node 314 is interjected between the operation node 310 and the child node 312. The run time instrumentation node 314 may be a function call to a run time instrumentation function that uses the child node 312 as one of the arguments and returns the value of the child node 312 from the function call to make the value available for the operation node 310. Interjecting the run time instrumentation node 314 between the operation node 310 and the child node 312 in this manner is virtually transparent to the operation node 310, since the value returned by the run time instrumentation node 314 is the value of the child node 312. Note that other arguments may be provided in a conventional manner to the function corresponding to the run time instrumentation node.

Refer to FIG. 11B, a binary operation node 320 has a left child 322, a right child 324, and a parent node 326. If the operation node 320 is a node of interest, then it may be instrumented by interjecting various nodes that are effectively transparent to the operation node 320 as well as effectively transparent to the left child 322, the right child 324 and the parent node 326.

Referring to FIG. 11C, the operation node 320 is instrumented by adding a variety of other nodes. One of the other nodes that is added is a temporary node 328 that is used to store the value of the left child 322. An assignment node 330 is used to assign the value that results from evaluating the left child 322 to the value of the temporary node 328. As discussed below, right subtree is evaluated before the left subtree. Thus, the operation that evaluates the value of the left child and assigns the value to the temporary node 328 will occur before other operations shown in FIG. 11C.

An instrumentation node 332 is represented in the subtree of FIG. 11C as a function having arguments that include the temporary node 328 and the right child 324. Since the arguments to the function that corresponds to the instrumentation node 332 are illustrated as a list, then a list end node 334 is shown at the end of the list. Other arguments to the instrumentation node 332, as well as arguments to the instrumentation node 314 of FIG. 11A may include a variety of other conventional compile time and run time parameters that facilitate debugging The function defined by the instrumentation node 332 returns the result of evaluating the right child 324. Thus, the next operation is the operation of the instrumented node 320, which receives the value of the temporary node 328 and the value of the instrumentation function 332. Note that, as discussed above, the value of the temporary node 328 is the value of the left child 322 and the value of the function defined by the instrumentation node 332 is the value of the right child 324. Thus, the operation node 320 is provided with values for children that are the same as those provided to the operation node 320 shown in FIG 11B. The node labeled "C" 336 of FIG. 11C simply causes execution of the right sub-tree (in this case having a root node 330 that does the assignment of the value of the left child 322 to the temporary node 328) followed by the operation of the left sub-tree (in this case the operation being instrumented 320). The node labeled "C" 336 provides the value derived from the operation node 320 to the parent node 326. Thus, the parent node 326 in FIG. 11C receives the same value provided to the parent node 326 in the configuration show in FIG. 11B. Instrumentation of the binary node illustrated in FIGS. 11B and 11C is expandable to ternary and to nodes having even more children using this same basic methodology described herein.

The run time instrumentation code may be implemented by using a separate set of routines (such as a DLL under the Windows environment) that is linkable to the code being instrumented via the function calls provided to the IR code in the course of instrumentation. In a preferred embodiment, the function calls are performed by indirectly calling functions that are initially set to an initialization routine that initializes the run time instrumentation system. The initialization routine determines if an executable library corresponding to the run time instrumentation routine is available. If not, then the addresses of the functions that are called indirectly by the indirect function calls added by instrumentation are set to "stub" routines that simply return without executing anything. Accordingly, even if the user program has been instrumented, if the run time instrumentation program is not also available during run time, then the instrumented code will simply return from the instrumentation function calls.

If, on the other hand, the initialization routine determines that the executable library for providing instrumentation during run time is available, then the addresses of the functions that are called indirectly by the instrumentation nodes are set to the instrumentation routines. The run time instrumentation routines that are used depend on the nature of the IR code being instrumented. Generally, the instrumentation routines may be fairly conventional and test for run time error conditions such as memory leaks (i.e., a scope change that causes a pointer variable to become undefined prior to freeing the allocated memory associated with the pointed variable). Other detected errors may include memory write operations that use variables that do not point to memory that is allocated to the variable, memory read operations that use memory variables that do not point to memory that is either allocated for the variable or, if allocated, then is not initialized. In addition, modifications to pointer variables may be instrumented to ensure that the pointer variables point to the proper allocated block of memory. Other run time instrumentation routines may test and compare the size of variables in connection with a data read from one memory location into another, test for indirect calls to assure that the pointer used points to executable code, and test that pointers that are compared are allocated to the same block of memory.

Once the IR tree 80 has been instrumented in the manner discussed above to create the instrumented IR tree data element 67, the tree deconstruction software 70 of FIG. 4 collapses the IR tree stored in the instrumented IR tree data element 67 and uses the other IR data element 68 to provide the instrumental IR Data Element 65. Collapsing the IR tree back into a flat file is a simple matter of using the conventional post order traversal algorithm to first write the right child sub-tree of each node, then the left child sub-tree, then the actual node. For the combo node, after the child tree is written, the list is processed, treating each item in the list as a top-level node in its own tree. This process is essentially the inverse of the process used to construct the IR tree, discussed above.

The other IR data element 68 shown in FIG. 4 may include a global symbol table that contains locations of each function contained in the IR code. Note that since IR code is being supplemented (i.e., increased in size) by the instrumentation process, then generally, the location of each of the functions within the IR code is likely to move. The locations of each of the functions are stored in the other IR data element 68 and are written back to the other IR data element 68 as the IR tree 80 is collapsed into a flat list by the tree deconstruction software 70 shown in FIG. 4. Note that global function symbols within the global symbol table, and corresponding functions within the IR tree, may be correlated in a conventional manner by using symbol keys that cross-reference items between the IR code and the items in global symbols table.

Once the instrumented IR data element 65 is provided, then, as shown in FIG. 3, the compiler 42 may continue the compile process by accessing the instrumented IR data element 65 to provide the object code 46. Instrumenting the IR code in this way is virtually transparent to the compiler 42 since the IR data element 64 and the instrumented IR data element 65 have virtually the same structure. The thus-provided object code 46 contains the additional nodes added during instrumentation, including the run time function calls that call the run time debugging routines.

During execution of the object code, errors may be indicated by the run time debugging routines in any one of a variety of conventional manners, including providing an indication on the screen and stopping execution of the code when the error occurs, logging errors to a file, or any one of a variety of other ways for indicating to a user that a run time error condition, or a potential run time error condition, has occurred.

Other embodiments also exist. Described below are methods of automatically editing the executable byte code representation of a computer program or other methods for generating instrumented byte code. In one embodiment, the byte code is altered by the addition of new instructions and/or the deletion or modification of existing instructions.

Byte code is a generic term for a family of binary (i.e., non-textual) file formats for computer software programs created by compiling source code written in a computer programming language. Byte code is a format that is usually independent of the source language from which it was compiled, and which is intended to be independent of any computer hardware and/or operating system on which it might run. Byte code programs are executed by a software program sometimes referred to as a virtual machine, byte-code interpreter or p-code interpreter, a separate version of which must be implemented for each computer hardware and/or operating system. One type of byte code, Java byte code, may be provided by compiling a Java source language program. The Java byte code may then be run on a computer having an appropriate program for interpreting the Java byte code. A detailed description of this may be found, for example, in *The Java Virtual Machine Specification*, by Tim Lindholm and Frank Yellin and published by Addison Wesley, of Reading Mass. 1997, which is incorporated by reference herein.

One objective of the instrumentation process is to alter the program to facilitate the gathering of diagnostic and statistical information on the program when it is executed; i.e., dynamic analysis. This allows the program's internal state to be monitored for variety of purposes. These purposes include, but are not limited to: diagnosing error conditions that occur at run time, creating a record of the inner details of program execution, measuring program execution to provide code coverage analysis and performance profiling, or providing additional run time error or exception handling.

Another objective of the editing process is to examine the byte code according to various heuristics; i.e., static analysis. Through static analysis, several types of useful information may be derived. These include, but are not limited to: code metrics and complexity analysis, usage information (including library usage), and enhanced symbolic information for debugging.

Static analysis also makes it possible to detect some types of errors that might not be caught at runtime, since it is difficult to guarantee that all code will actually be executed under all circumstances. These errors include, but are not limited to: improper parameter lists passed to functions, methods or procedures, and use of uninitialized variables.

There are many different ways to instrument byte code. In one embodiment, the editing is performed automatically as a separate post-compile process before the byte code is executed. In another embodiment, the editing is performed automatically by the run time environment itself, which has been modified to alter the code before it is executed. In a third embodiment, the final stage 55 of the compiler 42 shown in FIG. 3 generates instrumented byte code from the instrumented IR data 65 rather than generating the object code 46, as described above.

Figure 12:
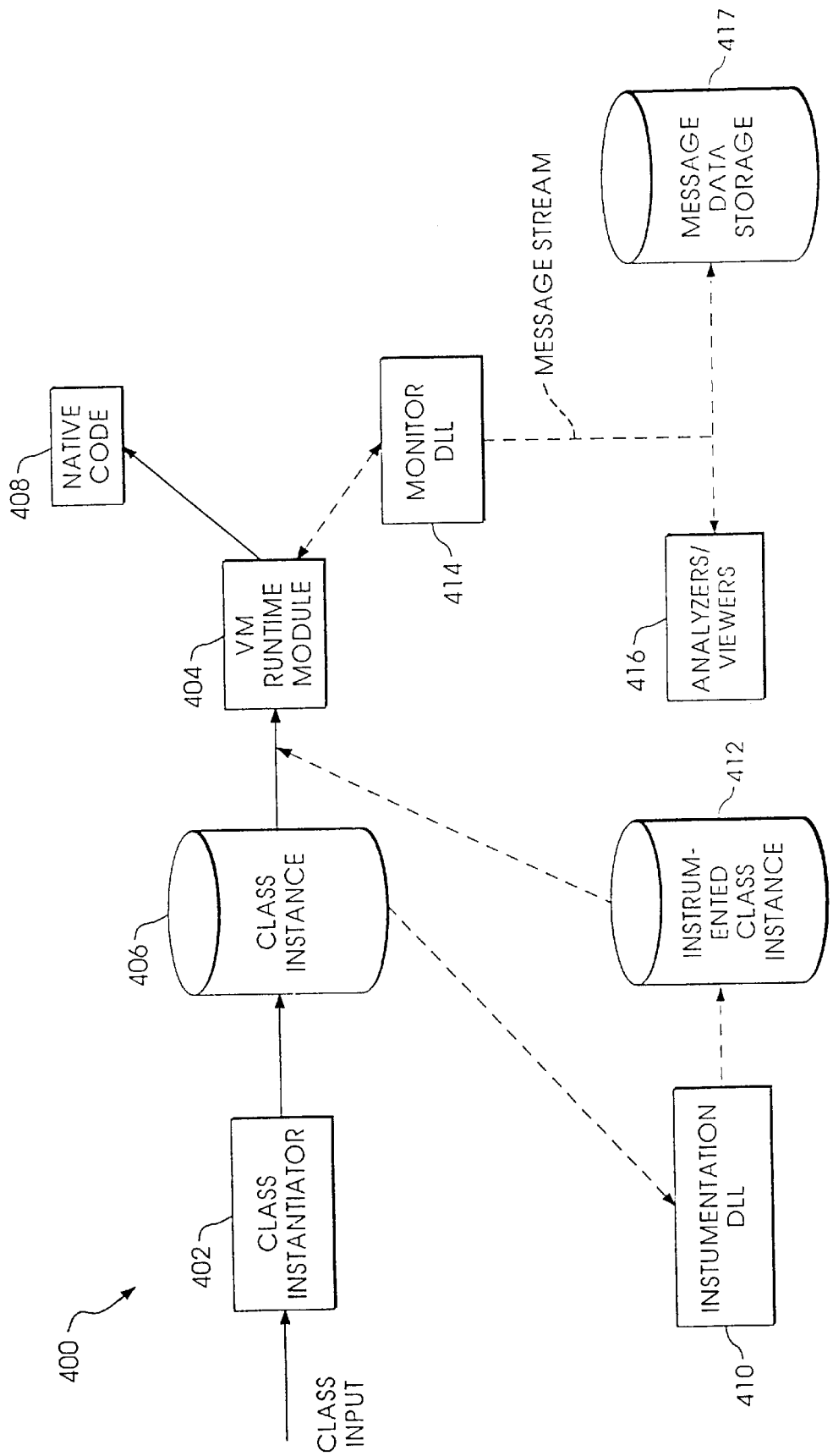
FIG. 12 is a data flow diagram illustrating instrumentation of byte code according to the present invention.

Referring to FIG. 12, a data flow diagram 400 illustrates operation of a virtual machine (VM) runtime system that interprets and runs byte code, such as Java byte code. In the data flow diagram 400, the VM runtime system has been broken up into two modules, a class instantiator 402 and a VM runtime module 404. The class instantiator 402 may receive a class input from any one of a variety of possible sources, including a file, over a local area network, from the Internet, from a zip file, from a CAB file, from another program that dynamically generates a class, or by any one of another variety of sources for computer data.

The class instantiator 402 generates a class instance 406, which, in a preferred embodiment, is a memory image representing a class that can be accessed by the VM runtime module 404 to perform operations indicated by the class instance 406. Absent any instrumentation, the class instance 406 is provided as an input to the VM runtime module 404 which interprets and executes the executable steps of the class instance 406 as well as performing any other operations indicated thereby.

In many implementations, a user can supplement the byte code provided in the class instance 406 with separate native code that may be used in conjunction with the byte code. In the case of the VM runtime module provided by Microsoft Corporation of Redmond, Wash., one of the interfaces between byte code and native code is called the Raw Native Interface (RNI). In the case of the VM runtime module provided by Sun Corporation of Burlington, Mass., an interface between byte code and native code is called Java Native Interface (JNI).

The interface may be provided by allowing declarations of method names and parameters in the byte code and by having a special designator indicating that the executable portions corresponding to the declared methods are found in one or more blocks of native code 408 that are separate from the VM runtime module 404. The native code runtime mechanism is described in more detail hereinafter in connection with describing instrumentation of native code.

Byte code may be instrumented by instrumenting each class as the class is loaded by the VM runtime system. As shown in FIG. 12, the class instance 406 is provided to an instrumentation DLL 410 which instruments the byte code of the class instance 406 to provide an instrumented class instance 412. The instrumented class instance 412 is provided as an input to the VM runtime module 404 instead of the class instance 406. That is, the VM runtime module 404 uses the instrumented class instance 412 instead of the class instance 406. The mechanism for providing the instrumented class instance 412 to the VM runtime module 404 is described in more detail hereinafter.

The instrumented class instance 412 contains native calls to a monitoring DLL 414 which provides a message stream to a plurality of analyzers/viewers 416 that are used to view the results of the instrumentation. In some instances, the monitoring DLL 444 may make calls in to the VM runtime module 404 to obtain more information for the message stream. Also note that it is possible to optionally store the message stream data in a message data storage 417. Storage of data in the message data storage 417 may be in addition to, or alternative to, providing the data to the analyzers/viewers 416. The monitoring DLL 414, the analyzer/viewers 416, and the message data storage 417 are described in more detail hereinafter.

Figure 13:
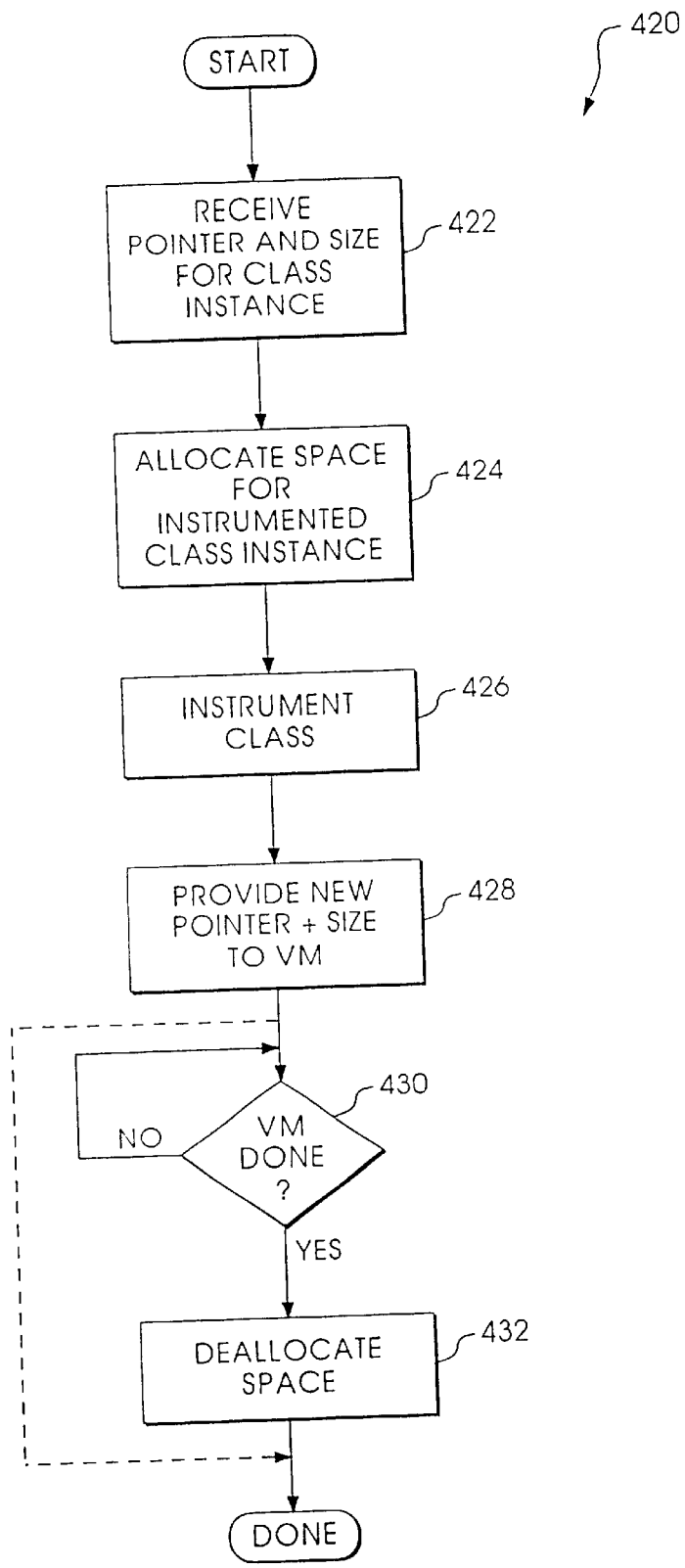
FIG. 13 is a flowchart illustrating steps for instrumenting byte code and executing the instrumented byte code according to the present invention.

Referring to FIG. 13, a flowchart 420 illustrates basic operation of the instrumentation DLL 410. The instrumentation program 410 operates in cooperation with the VM runtime system and may take advantage of particular hooks or calls provided by the vendors of the VM runtime system.

The flowchart 420 shows a first step 422 where the instrumentation DLL 410 receives a pointer and a size value for the class instance 406, which allows the instrumentation DLL 410 to access the class instance 406 in connection with providing instrumentation. Following the step 422 is a step 424 where the instrumentation DLL 410 allocates space for providing the instrumented class instance 412. In some embodiments, this allocation may be performed using conventional memory allocation routines. In other instances, the vendor of a VM runtime system may provide specialized memory allocation routines to be used. Following the step 424 is a step 426 where the class is instrumented to provide the instrumented class instance 412. Instrumentation of the class is described in more detail hereinafter. Following the step 426 is a step 428 where a pointer to the space that was allocated at the step 424, as well as a size value, are passed back to the VM runtime system in order to allow the VM runtime module 404 to use the instrumented class instance 412.

In embodiments where a specialized space allocation routine is used at the step 424, processing may be complete after the step 428. In those cases, the VM runtime module 404, or other portions of the VM runtime system, handle deallocation of the space allocated at the step 424.

In other embodiments, the instrumentation DLL 410 waits for the VM runtime module 404 to use the instrumented class instance 412. This is represented by the test step 430 which shows the instrumentation DLL 410 waiting for the VM runtime module 404 to signal the VM routine module 404 is done with the instrumented class instance 412. Of course, this may be implemented in a conventional fashion by having the VM call a particular entry point in the instrumentation DLL 410 so that the instrumentation DLL 410 does not have to poll the VM runtime module 404. Following the step 430 is a step 432 where the instrumentation program 410 deallocates the space that was allocated at the step 424. As discussed above, the steps 430, 432 may not be necessary in instances where a specialized memory allocation routine is used at the step 424 and the VM runtime system handles deallocation of the allocated memory.

The hooks in to the VM for providing the capabilities described above are provided by each VM vendor. For example, for the VM provided by Microsoft, the hooks are provided in the Microsoft Software Development Kit (SDK) for Java, Version 3.0, which is freely available from the Internet at http://www.microsoft.com/java. The hook used to intercept Java classes as they get loaded into the VM is declared in a C++ header file called "jclshook.h". In an installed version of the SDK, this file resides in the include directory called "include/jclshook.h". The mechanism that is used to cause the instrumentation DLL to be loaded into the Microsoft VM is part of Microsoft's Java Language Profiler Interface, which is discussed in detail in the SDK documentation. The SDK documentation is shipped as HTML. Two main files that provide information about the hook mechanism are Docs/htm/jprf_nar.htm and Docs/htm/jprf_ref.htm.

In a preferred embodiment, not all classes that are loaded are necessarily instrumented. As discussed in detail below, there are special cases of classes that are not instrumented at all. In addition, there are other special cases of classes that are only partially instrumented, as described in more detail below.

Figure 14:
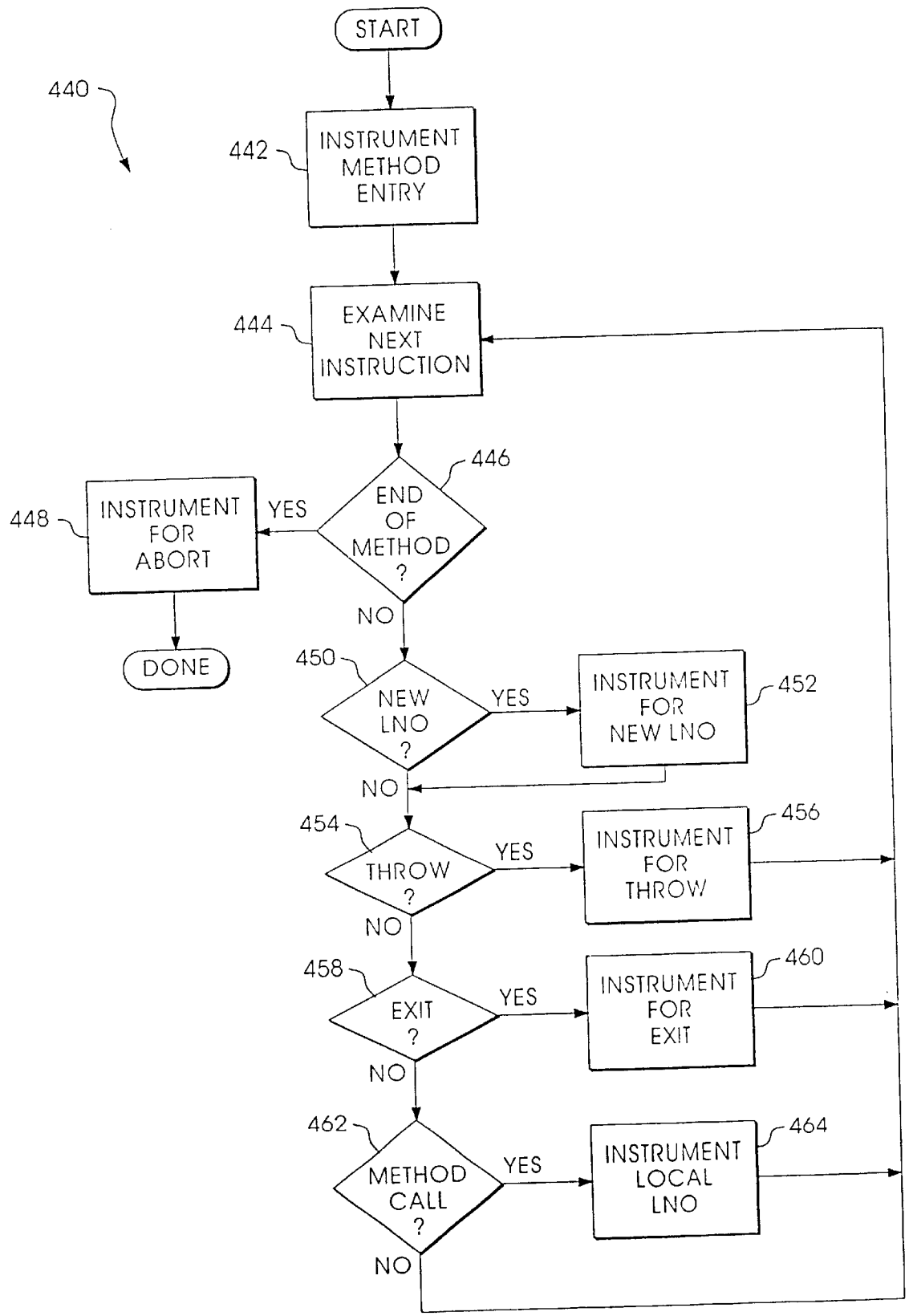
FIG. 14 is a flowchart illustrating instrumenting a method of a class according to the present invention.

Referring to FIG. 14, a flow chart 440 illustrates in more detail the step of instrumenting the class 426 of FIG. 13. All methods of the class, both static and non-static, are instrumented, with a few exceptions set forth below. The flow chart 440 illustrates instrumentation of a method.

Processing begins at a step 442 where the entry of the method is instrumented. Instrumentation of the method entry point at the step 442 is described in more detail hereinafter. Following step 442 is a step 444 where the next byte code instruction of the method is examined. The step 444 represents reading through each byte code instruction of the method and thus, each time the step 444 is performed, the next instruction of the method byte code is examined.

Following the step 444 is a test step 446 where it is determined if the end of the method has been reached. If it is determined at the test step 446 that the end of the method has been reached, then control passes to a step 448 where the method is instrumented to catch any aborts that occur while the method is being executed. Instrumenting for aborts at the step 448 is described in more detail hereinafter. Following the step 448, processing is complete since the end of the method has been reached.

If it is determined at the test step 446 that the end of the method has not been reached, then control passes from the test step 446 to a test step 450 where it is determined if a new line number has been reached. Note that, in many conventional byte code compilers, there is a switch allowing the user to obtain line number information correlating the source code line numbers with the byte code generated from that source code. The line number information may be provided in the form of a table. If line number information is available, then the test step 450 determines if the byte code being examined corresponds to a new line number in the source code by comparing the entries in the line number table with the byte code offset.

If it is determined at the test step 450 that byte code corresponding to a new source code line number has been reached, then control passes from the test step 450 to a step 452 where byte code is inserted into the method to cause a local line number variable to be set to the new line number when the method runs. The local line number variable, which is created at the method entry step 442, is described in more detail hereinafter.

Following the step 452 or the step 450 is a test step 454 where it is determined if a throw instruction has been reached. If so, then control passes from the test step 454 to a step 456 where the throw instruction is instrumented. Instrumenting the throw instruction at the step 456 is described in more detail hereinafter. Following the step 456, control passes back to the step 444 where the next byte code instruction is examined.

If it is determined at the test step 454 that a throw instruction has not been reached, then control passes from the test step 454 to a test step 458 where it is determined if an exit point for the method has been reached. An exit point for the method at the step 458 may be detected by, for example, detecting a return instruction in the byte code. If it is determined at the test step 458 that an exit point for the method has been reached, then control passes from the test step 458 to a step 460 where the exit point is instrumented. Instrumentation of the exit point at the step 460 is described in more detail hereinafter. Following the step 460, control passes back to the step 444 where the next byte code instruction of the method is examined.

If it is determined at the test step 458 that an exit point for the method has not been reached, then control passes from the test step 458 to a test step 462 where it is determined if the byte code instructions that are being examined correspond to a call to another method. If it is determined at the test step 462 that a method call has been reached, then control passes from the test step 462 to a step 464 where the line number of the current method is instrumented. Instrumenting the line number at the step 464 is described in more detail hereinafter. Following the step 464, control passes back to the step 444 where the next instruction is examined. The step 444 is also reached if it is determined at the step 462 that the byte code being examined does not correspond to a method call.

Figure 15:
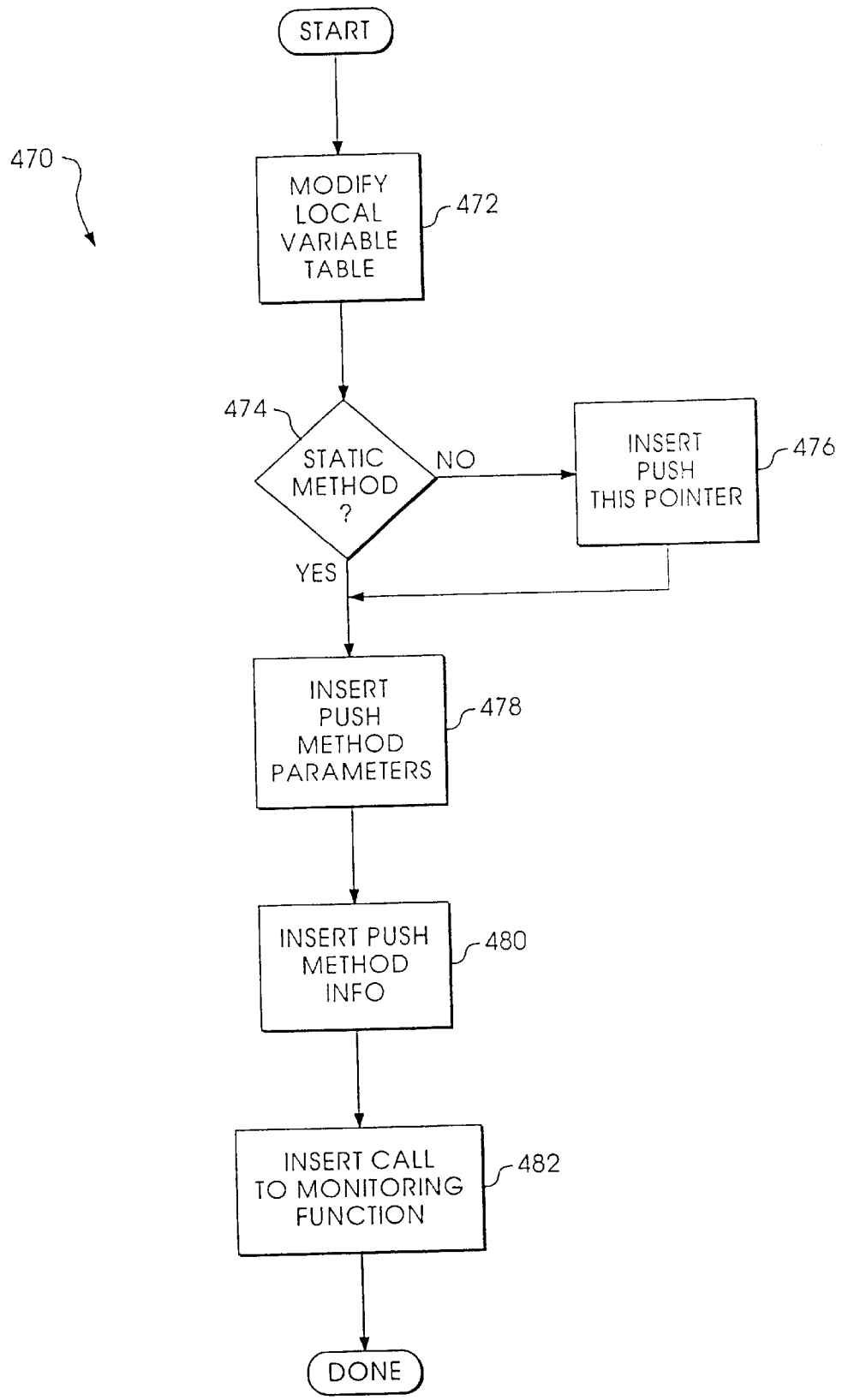
FIG. 15 is a flowchart illustrating in more detail a portion of the flowchart of FIG. 14.

Referring to FIG. 15, a flow chart 470 illustrates in more detail the instrumentation of the method entry step 442 of FIG. 14. Processing begins at a first step 472 where a local line number variable for the method is created in a conventional manner by incrementing max_locals for the function and providing storage space for the local line number variable. The local line number variable is used during instrumentation to keep track of lines of source code that correspond to the byte code and is set during run time to correlate the byte code and the source code line numbers of the method being instrumented. The local line number is also used in connection with other instrumentation that is described elsewhere herein.

Following the step 472 is a test step 474 where it is determined if the method being instrumented is a static method. The indication as to whether or not a method is a static method is provided in the access_flags byte associated with the method. If it is determined at the test step 474 that the method being instrumented is not a static method, then control passes from the step 474 to a step 476 where byte code instructions are inserted to push the thispointer of the non-static method on to the stack. For non-static methods, the thispointer may be used to identify the object on which the method was invoked.

Note that parameters that are passed during instrumentation are passed in a conventional fashion using the stack. Thus, the parameters are pushed on to the stack prior to invocation of the monitoring function being called.

Following the step 476, or following the step 474 if the method being instrumented is a static method, is a step 478 where instructions are inserted to push the method parameters that were passed to the method when the method was invoked. Note that the number and type of parameters passed to the method when the method was invoked may vary. Thus, the instructions that are inserted to push the parameters at the step 478 may similarly vary.

Following the step 478 is a step 480 where the byte code is instrumented by inserting instructions that push method information. In a preferred embodiment, the method information is a record that includes a method identifier, information identifying the number and types of parameters of the method, the local line number, and the type of instrumentation being performed. The same monitoring function may be called for instrumenting enter, exit, and abort. Thus, the type of instrumentation information differentiates among the three types within a generic monitoring function that is called.

Following the step 480 is a step 482 where instructions are inserted to call the monitoring function. The result of the call to the monitoring function that is inserted at the step 482 is described in more detail hereinafter. Following the step 482, processing is complete.

Figure 16:
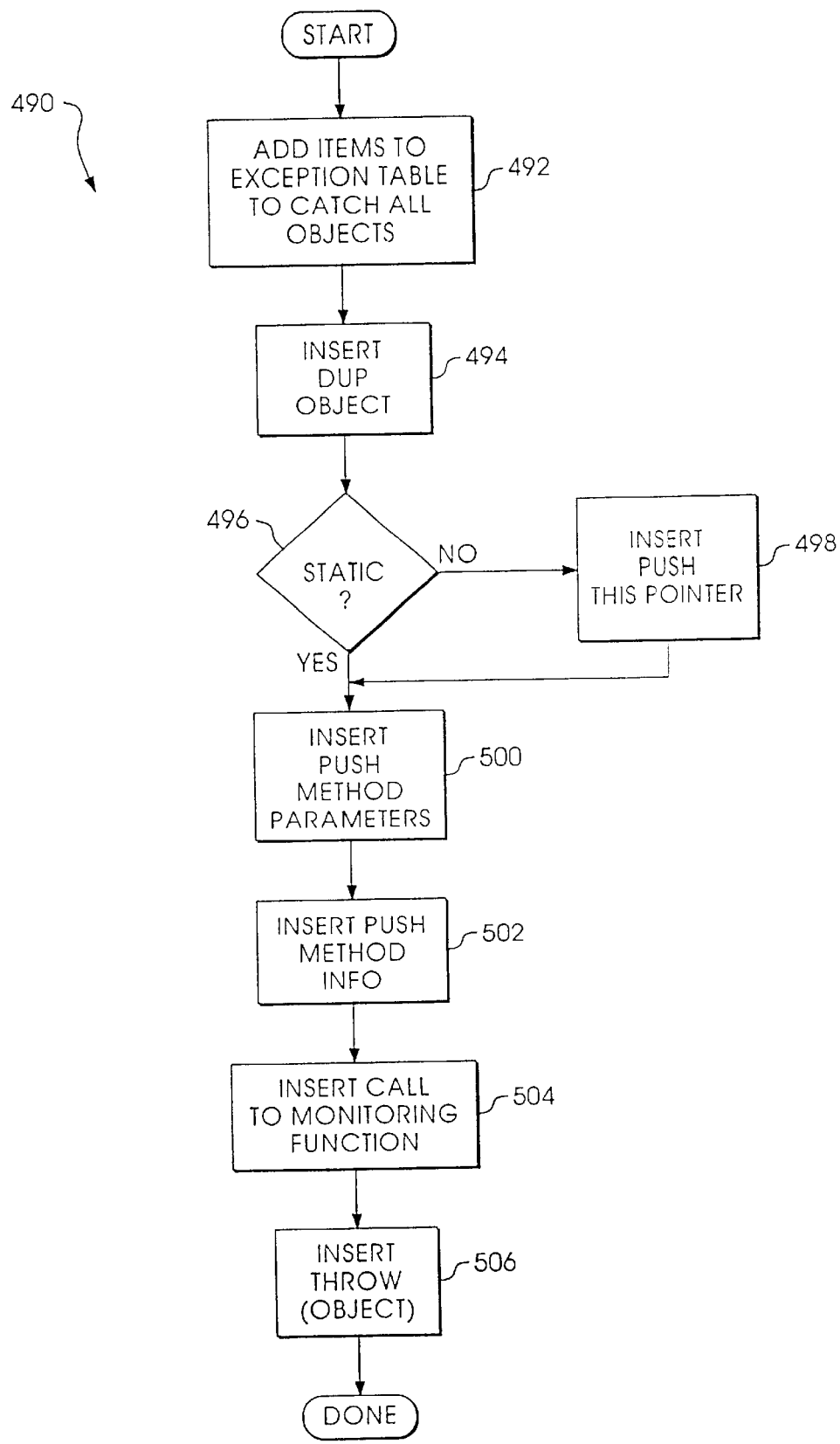
FIG. 16 is a flowchart illustrating in more detail a portion of the flowchart of FIG. 14.

Referring to FIG. 16, a flow chart 490 illustrates in more detail the instrumentation for an abort step 448 from the flow chart of FIG. 14. As discussed above, this instrumentation code is inserted at the end of the method being instrumented.

Processing begins at a first step 492 where the exception table is modified to indicate that the code being added in connection with instrumenting for abort is to be executed whenever an otherwise uncaught exception occurs. Following the step 492 is a step 494 where instructions are inserted to cause the object that is thrown in connection with the exception to be on the stack. Note that, in this instance, it is sufficient to duplicate (DUP) the item at the top of the stack since the thrown object is already at the top of the stack. In a preferred embodiment, both a pointer to the object, and what Microsoft refers to as the object's "hash code" are provided. The hash code is a unique identifier for an object. Use of the unique identifier is described in more detail hereinafter. Note that, unless indicated otherwise, all objects are pushed on to the stack along with the corresponding unique identifier (e.g., the hash code) therefor. For example, in instances where the thispointer is pushed on to the stack, a unique identifier (e.g., the hash code) for the thispointer is also pushed.

Following the step 494 is a test step 496 where it is determined if the method being instrumented is static and a step 498 for pushing the thispointer on to the stack. The steps 496, 498 are similar to the steps 474, 476, described above in connection with FIG. 15. Following either the step 496 or the step 498 is a step 500, which inserts instructions to push the method parameters on to the stack in a manner analogous to that discussed above in connection with the step 478. Following the step 500 is a step 502 that inserts instructions to push the method information on to the stack.

Following step 502 is a step 504 where byte code instructions are inserted to call the monitoring function. Following the step 504 is a step 506 where instructions are inserted to throw the object associated with the abort. Throwing the object in this manner causes execution of the code to be, more or less, the same as it would have been had the exception table not been modified at the step 492. Following step 506, processing is complete.

Figure 17:
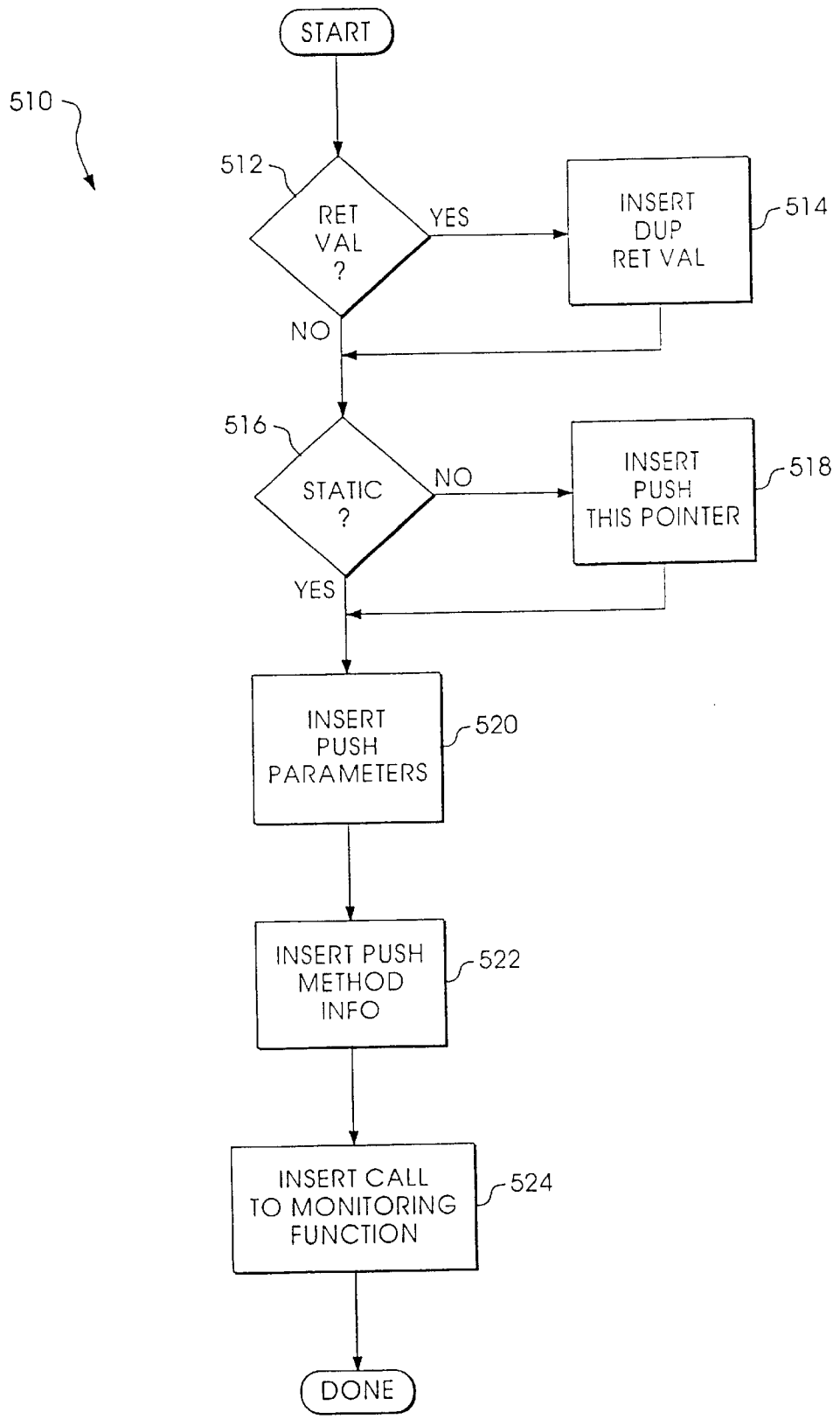
FIG. 17 is a flowchart illustrating in more detail a portion of the flowchart of FIG. 14.

Referring to FIG. 17, a flow chart 510 illustrates in more detail the processing at the step 460 of FIG. 14 where the method exit is instrumented. Processing begins at a test step 512 where it is determined if the method being instrumented has a return value.

The determination at the step 512 may be made in a conventional manner by examining the signature of the method, which is retrieved from the constant pool of the class instance that contains the method being instrumented. If it is determined at the test step 512 that the method being instrumented has a return value, then control passes from the test step 512 to a step 514 where instructions are inserted to cause a copy of the return value to be on the top of the stack. In this instance, it is sufficient to duplicate the value at the top of the stack since the return value of the method will already be at the top of the stack.

Following the step 514, or following the step 512 if the method does not have a return value is a test step 516 where it is determined if the method being instrumented is static and a step 518 for pushing the thispointer on to the stack. The steps 516, 518 are similar to the steps 474, 476, described above in connection with FIG. 15. Following step 518, or following the step 516 for static methods, control passes to a step 520 where instructions are inserted to push the method parameters in a manner analogous to that discussed above in connection with other instrumentation. Following the step 520 is a step 522 instruction are inserted to push the method information on to the stack.

Following the step 522 is a step 524 where instructions are inserted to call the monitoring function. Following the step 524, processing is complete.

Figure 18:
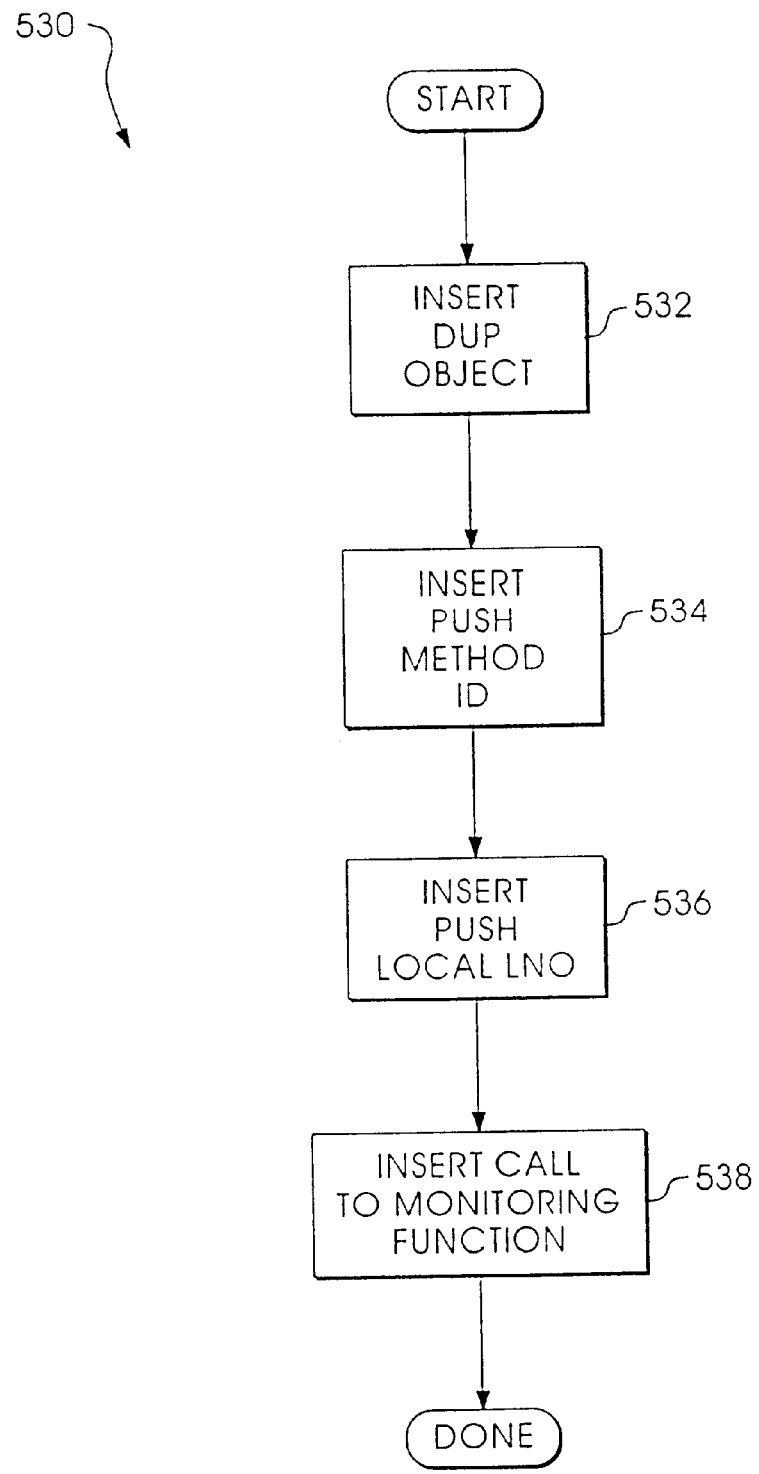
FIG. 18 is a flowchart illustrating in more detail a portion of the flowchart of FIG. 14.

Referring to FIG. 18, a flow chart 530 illustrates in more detail the step 456 of FIG. 14 of instrumenting a throw instruction. Processing begins at a step 532 where instructions are inserted to cause the object being thrown to be on the top of the stack. In this instance, it is sufficient to duplicate the item at the top of the stack, which is the object being thrown. The step 532 is similar to the step 494 of FIG. 16, described above. Following step 532 is a step 534 where instructions are inserted to push the method identifier (not the method information discussed above in connection with FIGS. 15–17). Following step 534 is a step 536 where instructions are inserted to push the line number on to the stack. Following step 536 is a step 538 where instructions are inserted to call the monitoring function. Following step 538, processing is complete.

Figure 19:
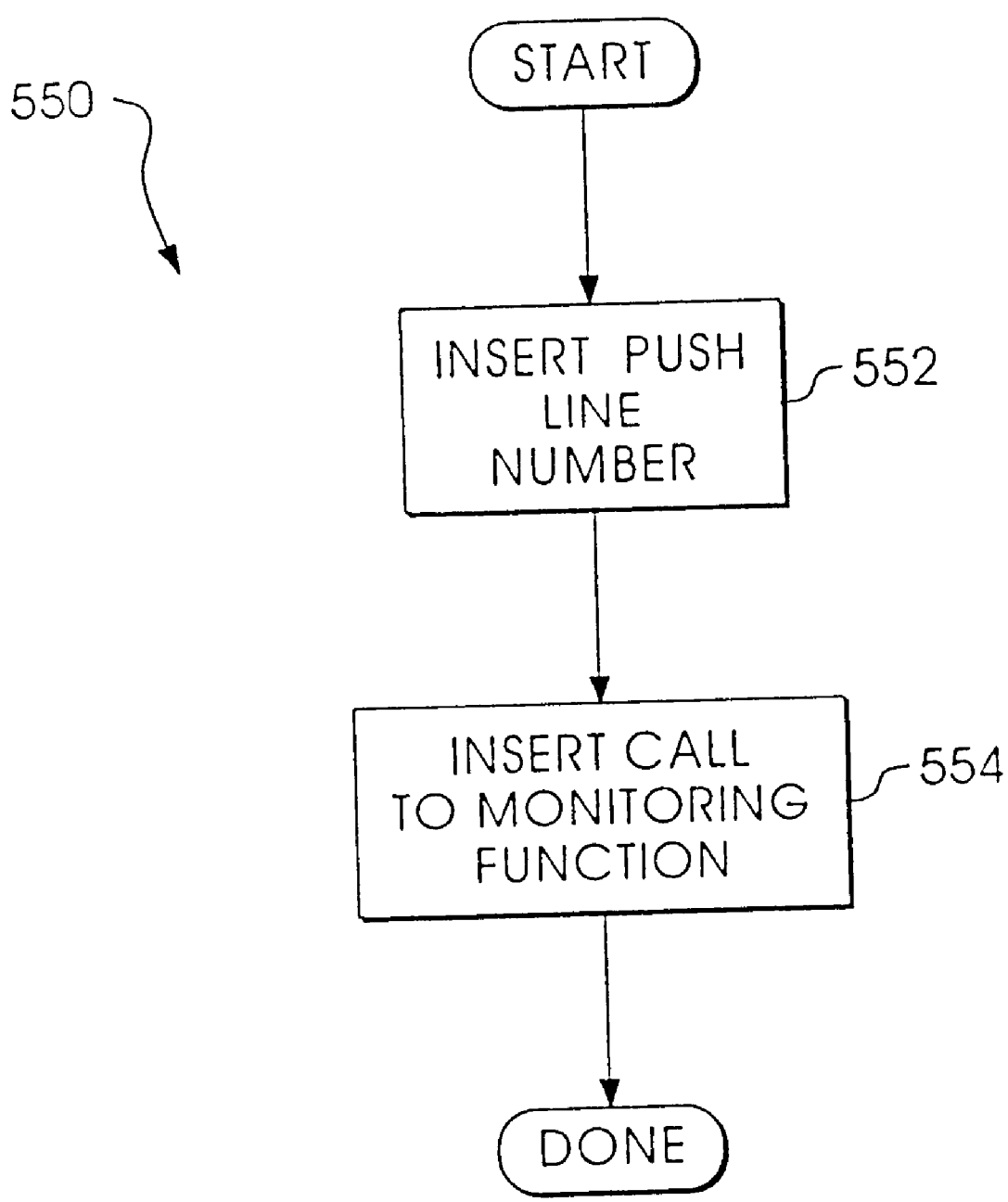
FIG. 19 is a flowchart illustrating in more detail a portion of the flowchart of FIG. 14.

Referring to FIG. 19, a flow chart 550 illustrates in more detail the step 464 of FIG. 14 where the line number is instrumented. Processing begins at a first step 552 where instructions are inserted to push the line number. Following step 552 is a step 554 where instructions are inserted to call the monitoring function. Following the step 554, processing is complete.

Figure 20:
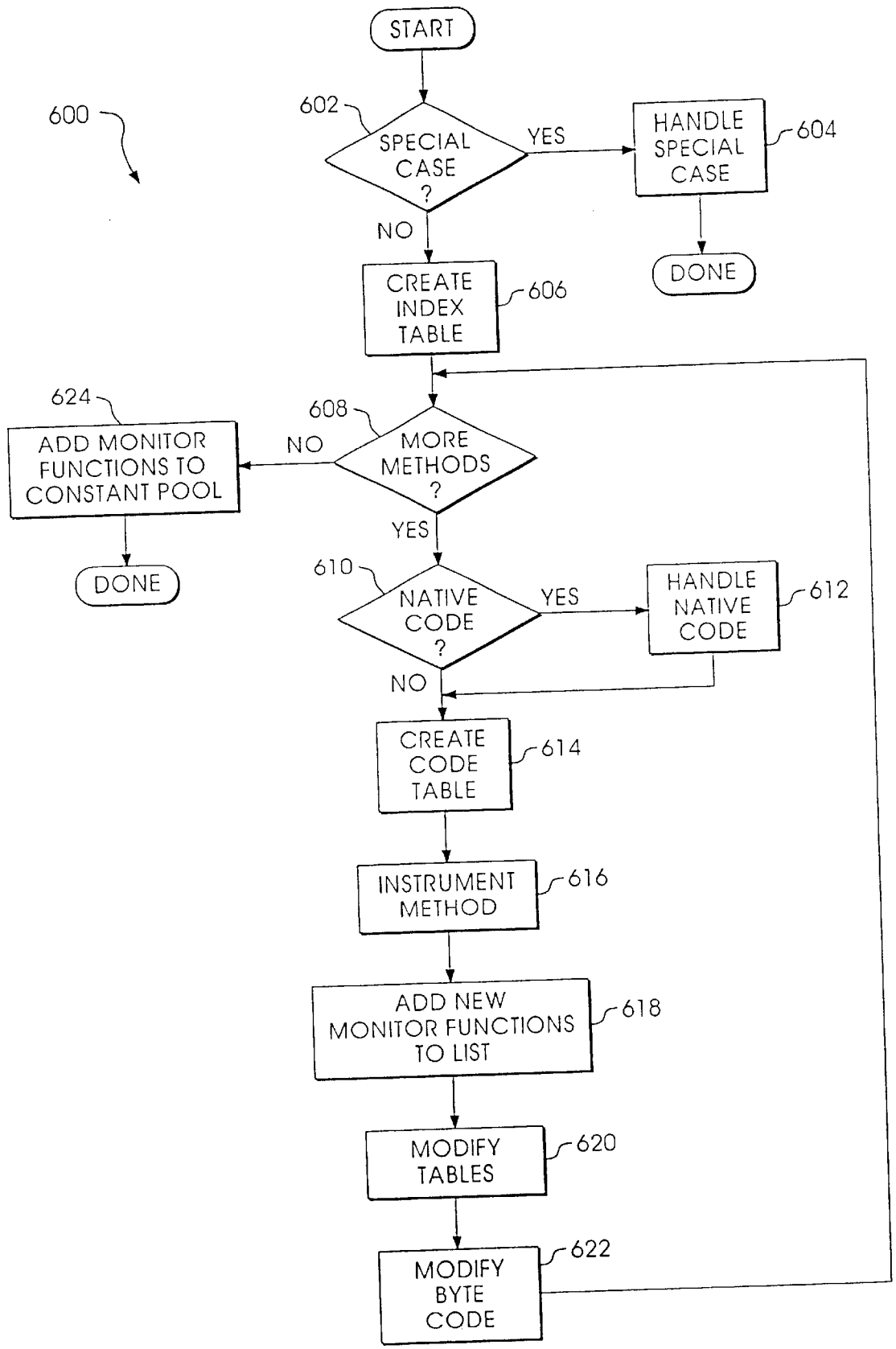
FIG. 20 is a flowchart illustrating instrumenting a class according to the present invention.

Referring to FIG. 20, a flow chart 600 illustrates instrumenting the class 406 of FIG. 12 to provide the instrumented class 412. Processing begins at a test step 602 where it is determined if the class being instrumented is a special class. Special classes are particular classes that either are not instrumented or are instrumented in a special way. Examples include classes containing low level byte code methods provided by the VM vendor where instrumenting the methods would not provide useful information to the user. In most instances, deciding whether to instrument various methods is a design choice based on a variety of functional factors familiar to one of ordinary skill in the art. If the class being instrumented is a special class, control passes from the test step 602 to a step 604 where the special class is handled in a manner described in more detail below. Following the step 604, processing is complete.

If it is determined at the test step 602 that the class being instrumented is not a special class, then control passes from the test step 602 to a step 606 where an index of the class instance is created. The index of the class instance may be a table containing entries indicating the offsets, in the class instance, of various items in the class instance, such as the offsets of each of the methods in the class. The class index is a convenient mechanism that can be used in a conventional manner to assist in providing the functionality described hereinafter.

Following the step 606 is a test step 608, which represents iterating through the methods of the class to instrument each method. If it is determined at the test step 608 that there are more methods to instrument, control passes from the test step 608 to a test step 610 where it is determined if the method being processed is implemented in native code. As discussed above, different VM vendors provide different mechanisms for allowing native code to be called from byte code. In many instances, the interface involves declaring the native method in the source code and providing a specific identifier with the declaration indicating that the executable portion of the native function is provided in a routine external to the resulting byte code.

If it is determined at the test step 610 that the method is implemented in native code (by examining the access_flags in the class), control passes from the step 610 to a step 612 where instrumenting the native code is handled by, for example, adding a byte code wrapper to the method. The wrapper causes the VM (and the instrumentation software) to treat the native method as a conventional byte code method. Processing at the step 612 may include modifying the native attribute of the method to convert the method to a byte code method, creating a new name for the native method and adding the new name as a private native method declaration, and adding byte code instructions to call the native method under the new name. At runtime, part of the initialization of the instrumentation DLL 410 is to patch the operating system's GetProcAddress API (or its equivalent for the particular operating system being used) to intercept calls to the new name and return the address of the native method's code.

Alternatively, a native code method may be handled by first adding the name of the native code method to a special list of pending methods. The GetProcAddress( ) routine is then patched so that, at runtime, each call from the VM to GetProcAddress( ) is intercepted to first determine if the called method is on the special list.

The patch uses an assembly code thunk that includes a small amount of assembly code and a class instance (data structure) that lets the patch code get control before the native code routine starts, and also gets control back when the native code routine exits. The class instance may consist of the following, or information that allows derivation of the following:

Hsymbol for the particular method

Signature of the particular method

Pointer to the actual native code routine (presumably in a user-supplied DLL)

The assembly thunk code may put a pointer to the class instance into whichever register the C++ compiler uses for its thispointer, and jump to a common class member function. As is known in the art, the thispointer is a pointer to an address where data for an object is stored. The thispointer is implicitly passed to all non-static class methods as the first parameter to the method. When the compiler sees an unqualified reference to a field in the class that the method being compiled belongs to, the thispointer is used to locate the storage location for the field.

This common class member function will build data structures equivalent to what is described elsewhere herein for the instrumentation of a regular Java method. These structures may be built by interpreting the signature of the method, which is straightforward. The function may call the runtime routine corresponding to method entry. The function may then make a copy of the parameter list, and invoke the actual native code routine. Upon return, it is possible to use the Exception Occurred( ) function (or equivalent, depending upon the VM implementation), to determine if a Java exception was thrown by the actual native function. If not, the function will then call the method exit logic in a manner similar to method entry. If an exception has occurred, the function will call appropriate method abort logic, as described elsewhere herein. Finally, the function will restore the stack and return to the VM.

Following the step 610 or the step 612 is a step 614 where a code table is created. The code table is an array of records that is indexed by the offset in the class instance of each byte code instruction in the uninstrumented class instance. The records contain the new offset of the byte code instructions, which are moved due to insertion of instrumentation instructions. In addition, as described in more detail below, the records of the code Program counter mapping table contain a field indicating the line of source code corresponding to the instrumented byte code.

Following the step 614 is a step 616 where the method is instrumented in a manner described above in connection with FIGS. 14–19. Note that part of the instrumentation process includes modifying the byte code to add calls to the monitoring functions. The native declarations for the monitoring functions are provided in a separate class which is not instrumented, and thus is one of the special classes discussed above in connection with the steps 602, 604. The code for the monitoring functions is provided in the monitoring DLL 414 shown in FIG. 12. Operation of the monitoring DLL 414 is described in more detail hereinafter.

Note also that some VM's are type sensitive with respect to method parameters. Thus, selection of a particular monitoring function may depend, in part, on the number and type of method parameters that are passed to the monitoring function. Thus, one monitoring function may be used to instrument the entry point of a method that is passed two objects while a different monitoring function may be used to instrument the entry point of a method that is passed two integers.

As an alternative, it may be possible to create and insert calls to monitoring functions that are designated as private native functions. Then, each of the created functions may be intercepted by patching, in any one of a variety of conventional manners, the API GetProcAddress( ) (or its equivalent) to detect when the VM obtains an address for one of the created functions. This alternative technique eliminates the need to have a separate class for the monitoring functions.

Following the step 616 is a step 618 where names and signatures (types) of the monitoring functions that are added to the method in connection with instrumenting the method are added to a list. As described in more detail below, the list is used to modify the constant pool of the class after all of the methods have been instrumented.

Following the step 618 is a step 620 where various tables are modified as a result of the instrumentation. At the step 620, the code table, created at the step 614, is modified to reflect the new offsets of the instrumented byte code. The offsets change because of the instrumentation byte code that is inserted. The code table is used in a manner described below to modify the instrumented byte code to update any control flow instructions that become invalid because of the change in the offsets. The line number table is also modified at the step 620. As discussed above, the line number table correlates source code line numbers with byte code offsets. Since instrumentation modifies the byte code offsets, then the line number table requires modification at the step 620 to reflect the offset change. The class exception table is also modified at the step 620. The exception table is updated to reflect the new byte code offsets in a manner similar to modification of the line number table.

Following the step 620 is a step 622 where the byte code is modified to update branch instructions to reflect the new offsets of the instrumented byte code. This may be performed using the code table, discussed above in connection with the steps 614, 620. Control flows from the step 622 back to the step 608 to instrument the next method.

If it is determined at the step 608 that there are no more methods to instrument, control passes from the step 608 to a step 624 where the monitoring functions are added to the constant pool of the class. The constant pool contains information about all of the methods that are called from methods within the class being instrumented. Thus, when the methods are instrumented by adding calls to the monitoring functions, information about the monitoring functions is added to the constant pool, which is performed in a conventional fashion at the step 624.

Figure 21:
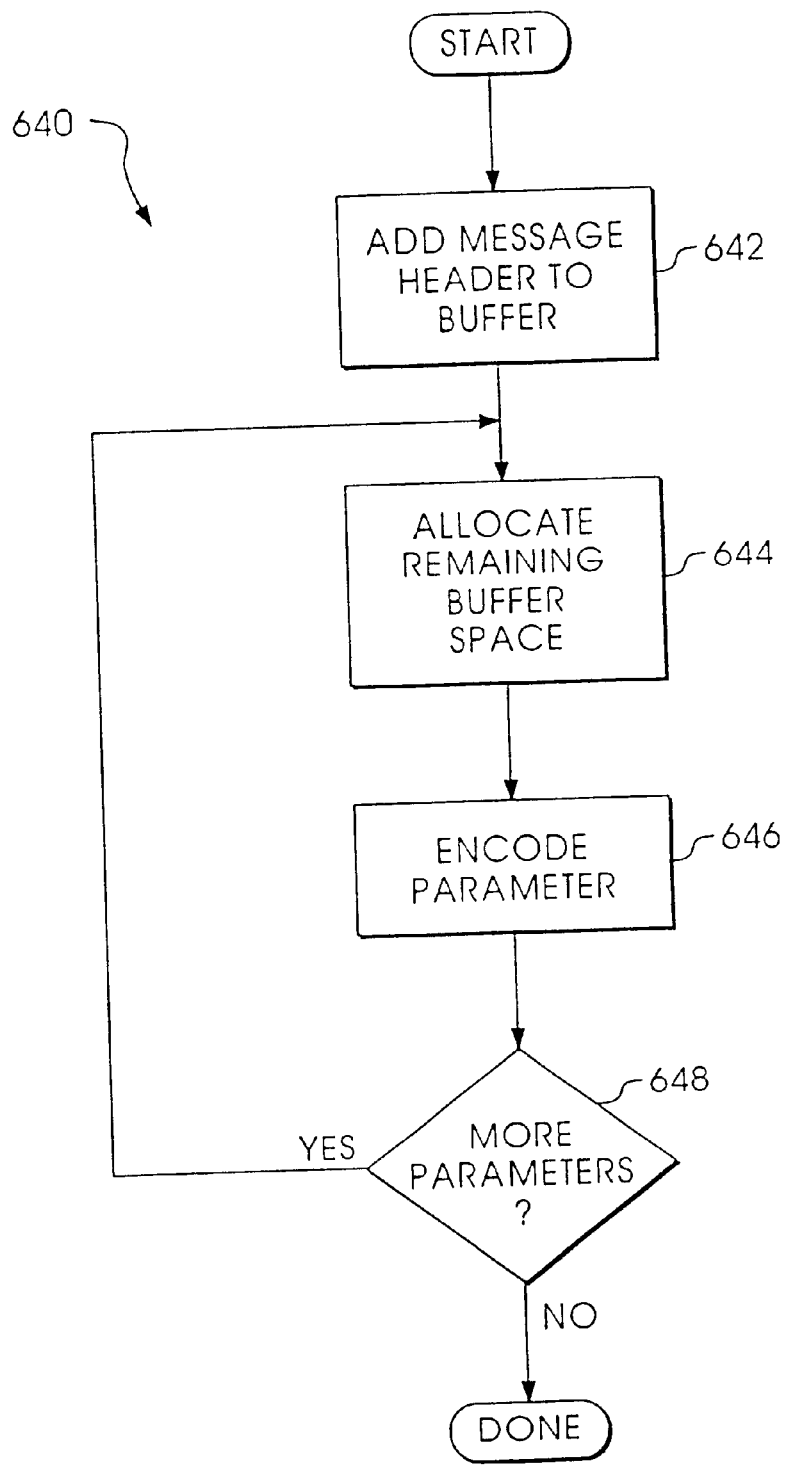
FIG. 21 is a flowchart illustrating passing data collected by instrumentation according to the present invention.

Refreshing to FIG. 21, a flow chart 640 illustrates in more detail steps performed by the monitoring DLL 414 in connection with providing data to the analyzer/viewers 416 and/or the message data storage 417 via the message stream therebetween. As discussed above, the monitoring DLL 414 may be implemented as native code that is called via the monitoring function calls that are inserted into the instrumented class 412 by the instrumentation DLL 410.

Note that much of the processing of the monitoring DLL 414 may be performed by having the monitoring DLL 414 call byte code functions that are being handled by the VM run-time module 404. For example, it may be useful to call various byte code functions that provide additional information about array elements or object fields. The names and parameters of these functions may vary depending on the VM vendor. Thus, the discussion that follows does not identify the particular functions called to perform the operations and tests described herein. However, one of ordinary skill in the art will recognize where these function calls belong in connection to the description that follows.

Processing begins at a first-step 642 where a message header is added to a buffer that contains data transmitted via the message stream. The information that is passed from the monitoring DLL 414 to the analyzer/viewers 416 and/or the message data storage 417 may be passed using a fixed-length buffer having, in a preferred embodiment, 2100 bytes. Thus, all of the parameter information from the monitoring function calls is added to the 2100 bytes in a manner described in more detail below.

Following step 642 is a step 644 where the remaining space of the buffer is allocated among the parameters of the monitoring function that is called. This is done by simply dividing the number of bytes left in the buffer by the number of parameters that remain to be sent. For example, if there are 2,000 bytes left in the buffer, and if there are 5 parameters, then each parameter is allocated 400 bytes. As discussed in more detail below, this allocation may change depending on how many bytes each parameter actually uses as it is provided to the message buffer.

Following step 644 is a step 646 where each parameter is encoded. The encode parameter step 646 is described in more detail hereinafter. However, generally, the step 646 represents placing the parameter information into the buffer.

Following the step 646 is a test step 648 where it is determined if there are more parameters to be encoded and placed in the buffer. If not, then processing is complete. Otherwise, control passes from the step 648 back to the step 644 where the remaining buffer space is allocated among the remaining parameters. Note that it is possible that the amount of space allocated per parameter will increase as parameters are placed into the message buffer. This occurs because, if a parameter uses less than the allocated space, then, at the step 644, the allocated buffer space that was not used by the previous parameter is added to the buffer space for the other parameters. For example, assume that initially a function call has 5 parameters and there are 2,000 bytes at the step 644 when the first parameter is processed. If the first parameter only uses 100 bytes, then, for the next iteration, at the step 644 there will be 4 parameters and 1900 bytes. Thus, for the next iteration, each parameter is allocated 475 bytes. Note also that it is possible that all of the parameters do not use all of the buffer space.

Figure 22:
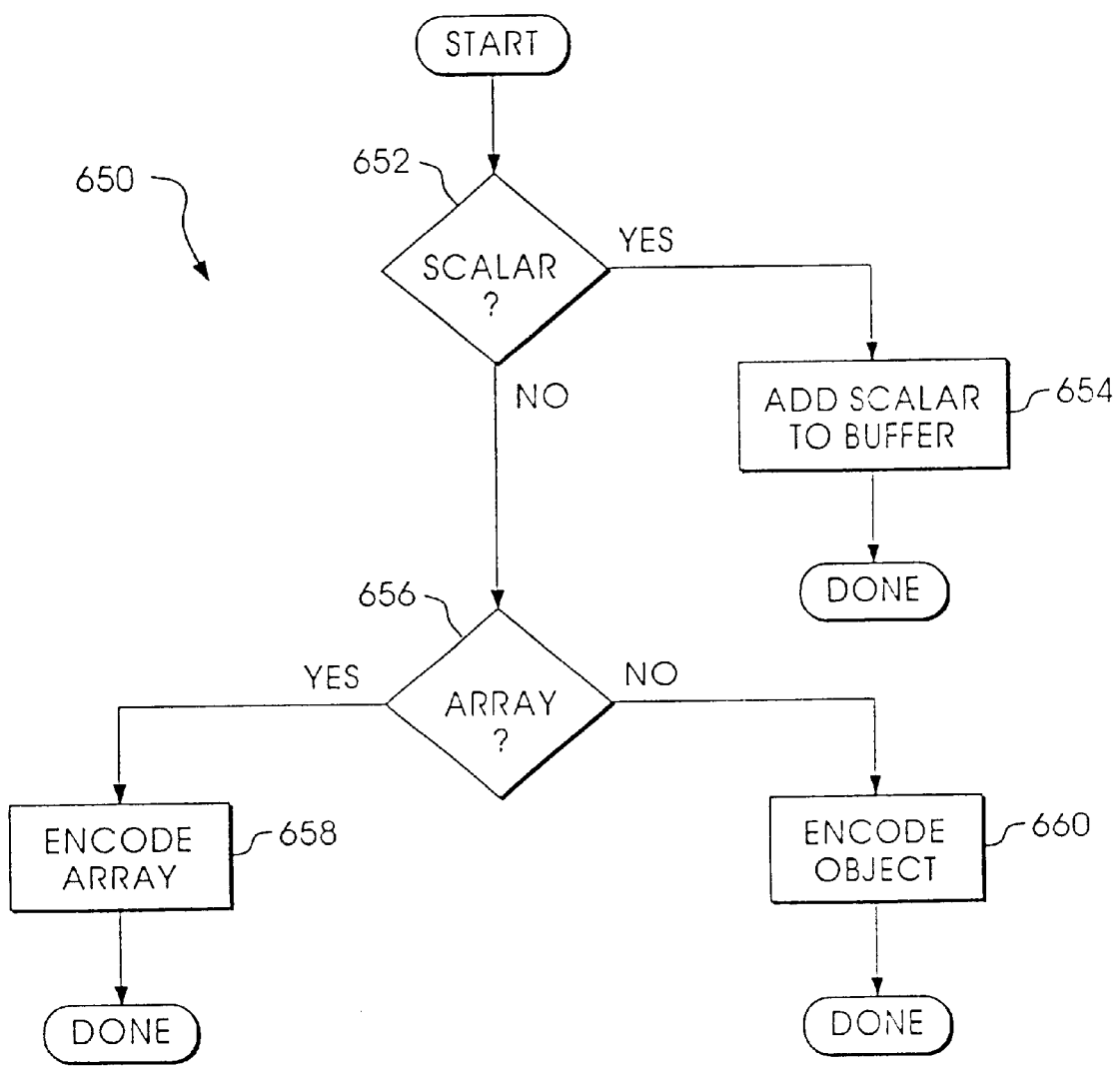
FIG. 22 is a flowchart illustrating in more detail a portion of the flowchart of FIG. 21.

Referring to FIG. 22, a flow chart 650 illustrates in more detail the step 646 of FIG. 21 where each parameter is encoded and placed onto the buffer. Processing begins at a first step 652 where it is determined if the parameter is a scalar (i.e., an integer, a character, a boolean, etc.). If it is determined at the test step 652 that the parameter is a scalar, then control passes from the step 652 to a step 654 where the scalar is added to the buffer by simply placing a number of bytes corresponding to the scalar onto the message buffer. Following step 654, processing is complete and the parameter has been encoded.

If it is determined at the test step 652 that the parameter is not a scalar, control passes from the test step 652 to a test step 656 where it is determined if the parameter is an array. If so, then control passes from the step 656 to a step 658 where the array is encoded. Encoding the array onto the message buffer at the step 658 is described in more detail hereinafter. Following the step 658, processing is complete.

If it is determined at the test step 656 that the parameter is not an array, control passes from the test step 656 to a step 660 where the parameter (which, by default, is an object) is encoded. Encoding the object parameter at the step 660 is described in more detail hereinafter. Following the step 660, processing is complete.

Figure 23:
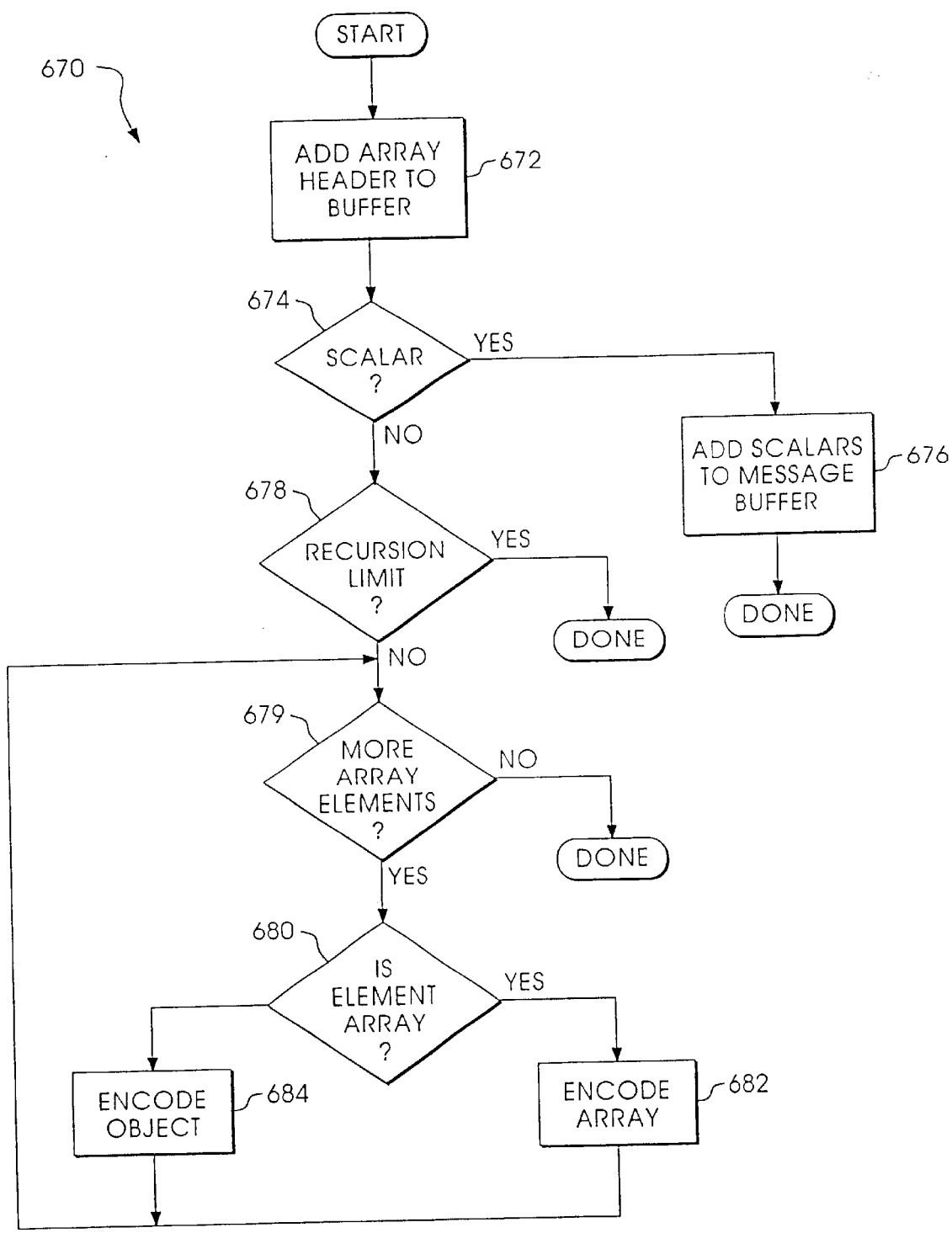
FIG. 23 is a flowchart illustrating in more detail a portion of the flowchart of FIG. 22.

Referring to FIG. 23, a flow chart 670 illustrates in more detail the array encoding step 658 of FIG. 22. Processing begins at a first step 672 where header information for the array is added to the message buffer. Following step 672 is a test step 674 where it is determined if the array is an array of scalars. If so, then control passes from the step 674 to a step 676 where the values of each of the scalar elements is added to the message buffer. Note that, at the step 676, the number of scalar values that are added to the message buffer may be limited according to the amount of message buffer space allocated for the array parameter. Thus, if each scalar element of the array uses, for example, four bytes, and there are one hundred bytes set aside in the message buffer for the array parameter, then the first twenty five array elements will be placed in the message buffer at the step 676. If there are less than twenty five array elements, then all of the array elements are placed in the message buffer.

If it is determined at the test step 674 that the array elements are not scalars, then control passes from the step 674 to a test step 678 where it is determined if the recursion limit has been reached. As discussed in detail below, arrays of arrays and arrays of objects are placed into the message buffer using recursion. However, it is desirable to limit the depth of the recursion to, for example, three. Thus, it is determined at the test step 678 if the recursion limit has been reached and, if so, then processing is complete.

If it is determined at the test step 678 that the recursion limit has not been reached, then control passes from the test step 678 to a test step 679 where it is determined if there are any remaining array elements in the array that have not been processed. If there are no more array elements, then processing is complete. Otherwise, control passes from the test step 679 to a test step 680 where it is determined if the current array element is, itself, an array. If so, then control passes from the test step 680 to a step 682 where the array encoding routine shown in FIG. 23 is recursively called for the array element. Following the step 682, control passes back to the step 679 to process the next array element.

If it is determined at the step 680 that the element being processed is not an array, then, control passes from the step 680 to a step 684 where an encode object routine is called for each element of the array. Note that it cannot be assumed that an array of objects will consist of elements that are objects, because, in some byte code languages (such as Java), an array can be stored in a field or array element that is declared as being an object. Therefore, the runtime check at the step 680 is useful. Following the step 684, control passes back to the step 679 to process the next array element.

Figures 24, 25:
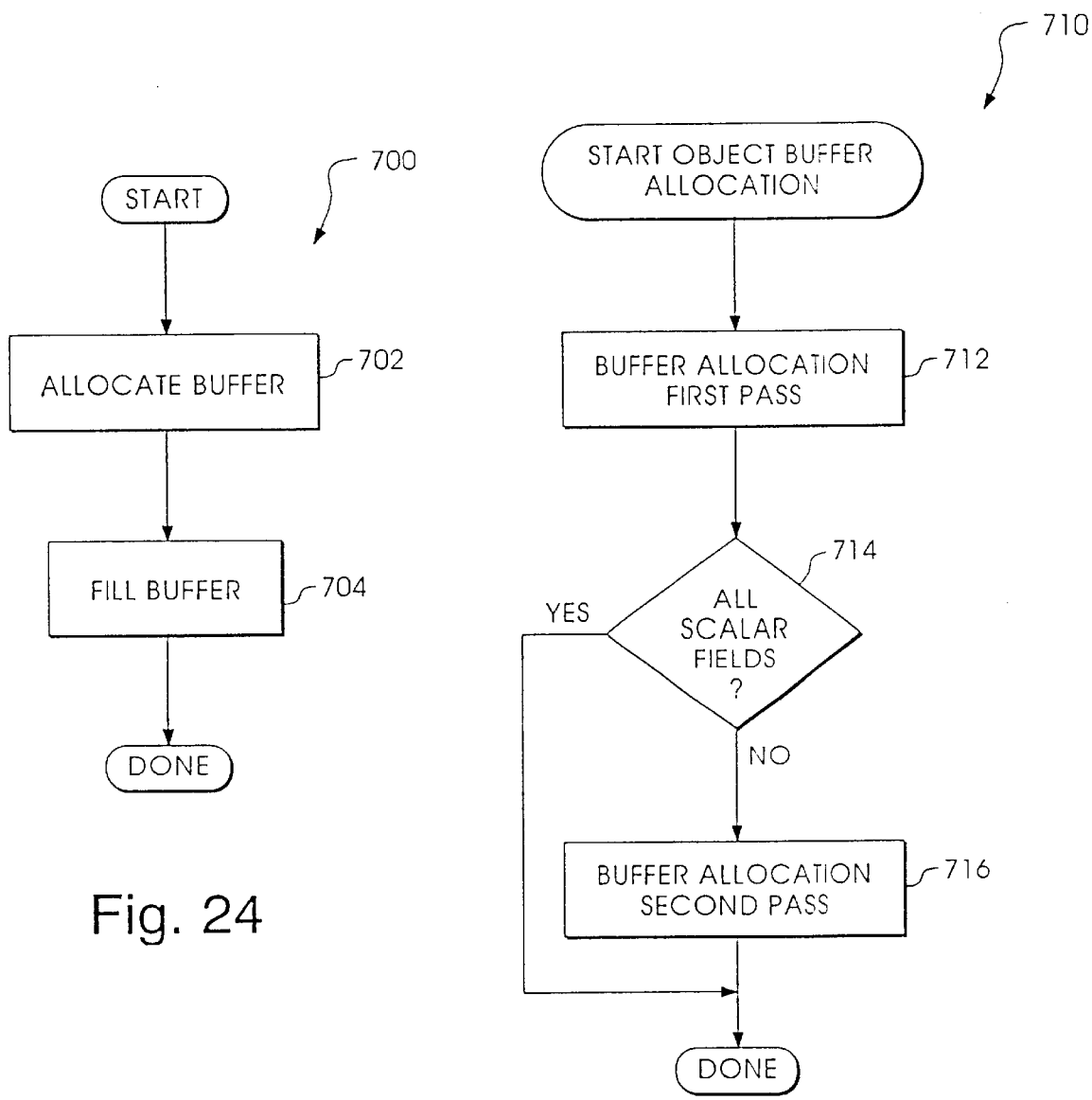
FIG. 24 is a flowchart illustrating in more detail a portion of the flowchart of FIG. 22.
FIG. 25 is a flowchart illustrating in more detail a portion of the flowchart of FIG. 24.

Referring to FIG. 24, a flow chart 700 illustrates adding an object to the message buffer. At a first step 702, the buffer space is allocated for the fields of the object (scalars and headers of array and object subfields) as well as for some of the data in the array and object subfields, as described below. At the allocation step 702, the data that will be placed into the buffer is marked for later copying into the message buffer. Following the step 702 is a step 704 where the message buffer is filled according to the data that is marked at the step 702. The steps 702, 704 are described in more detail hereinafter.

Referring to FIG. 25, a flow chart 710 illustrates the allocate buffer step 702 of FIG. 24. Processing begins at a first step 712 where a first pass of buffer allocation takes place. The first pass of buffer allocation at the step 712 is described in more detail hereinafter.

Following the step 712 is a test step 714 where it is determined whether all of the fields of the object are scalars. If so, then processing is complete. Otherwise, control passes from the test step 714 to a step 716 where a second pass of buffer allocation is performed. The second pass of buffer allocation at step 716 is described in more detail hereinafter.

Figure 26:
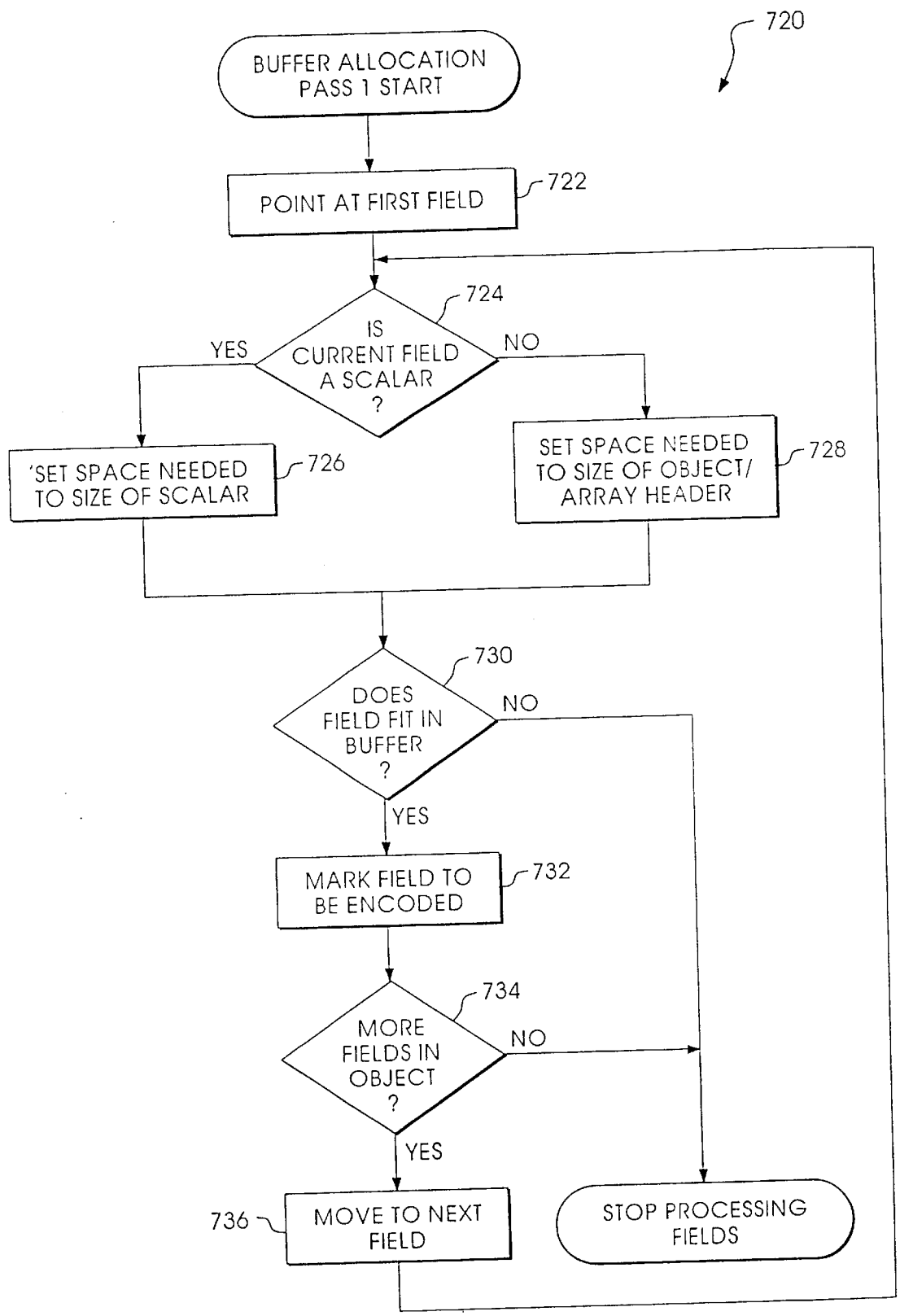
FIG. 26 is a flowchart illustrating in more detail a portion of the flowchart of FIG. 25.

Referring to FIG. 26, a flow chart 720 illustrates the first pass of buffer allocation at the step 712 of FIG. 25. Processing begins at a first step 722 where a pointer is set to point to the first field of the object. Following step 722 is a test step 724 which determines if the current field (i.e., the field that is pointed to by the pointer) is a scalar. If so, then control passes from the test step 724 to a step 726 where the space needed for the size of the scalar is determined. Alternatively, if it is determined at the step 724 that the current field is not a scalar, then control passes from the test step 724 to a step 728 where the space needed for an object header or array header (as appropriate) is reserved.

Following either the step 726 or the 728 is a test step 730 which determines if the amount of space allocated at one of the steps 726, 728 will fit in (i.e., be less than) the remaining space of the message buffer. If not, then processing for the first pass is complete. Otherwise, control passes from the test step 730 to a step 732 where the field that is being processed is marked to be placed in the buffer. Following the step 732 is a test step 734 which determines if there are more fields in the object to be processed. If not, then processing for the first allocation pass is complete. Otherwise, control passes from the test step 734 to a step 736 where the pointer is set to point at the next field of the object. Following the step 736, control passes back to the test step 724, discussed above.

Figure 27:
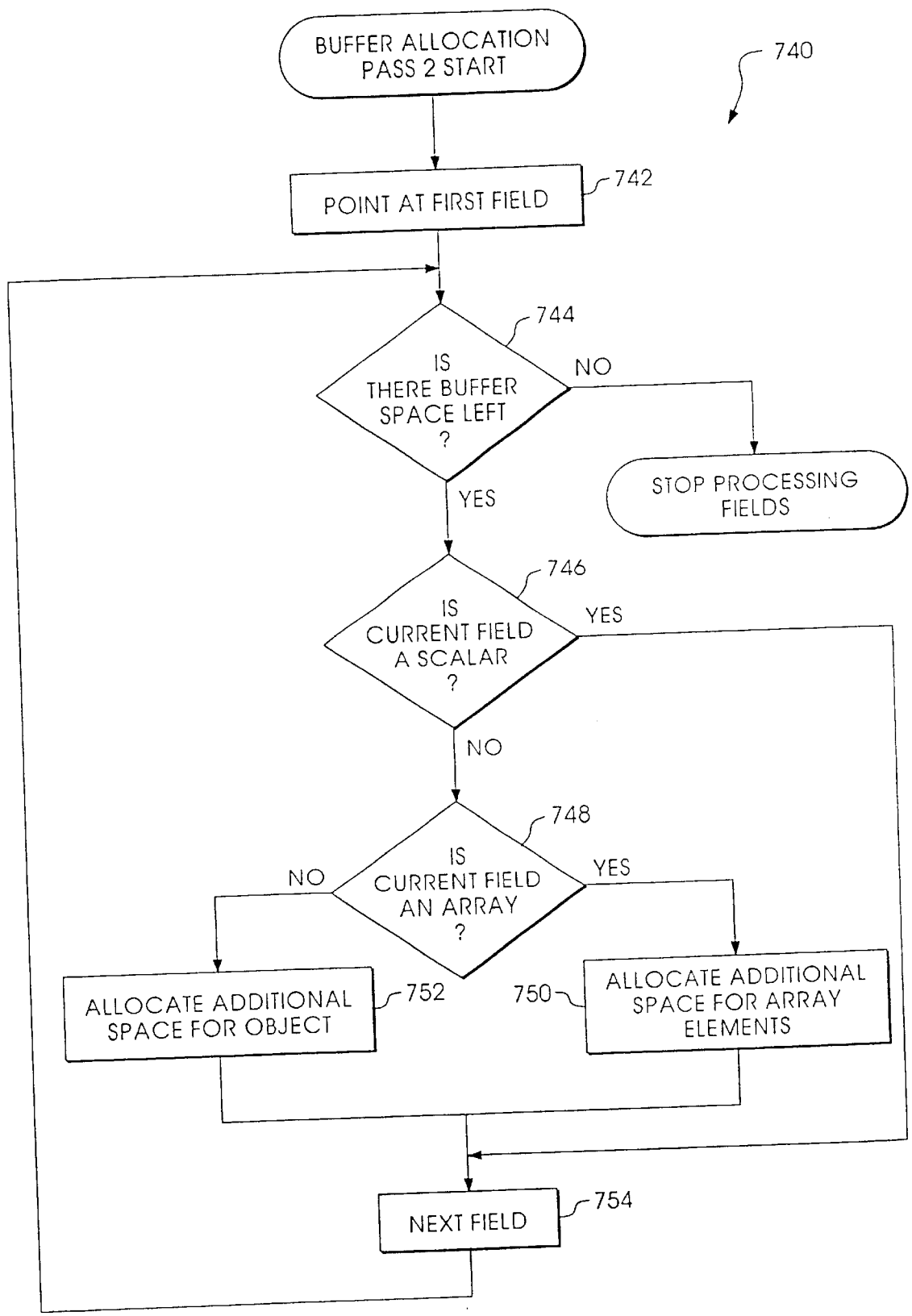
FIG. 27 is a flowchart illustrating in more detail a portion of the flowchart of FIG. 25.

Referring to FIG. 27, a flow chart 740 illustrates the second pass of buffer allocation at the step 716 of FIG. 25. Processing begins at a first step 742 where a pointer is set to point to the first field of the object. Following the step 742 is the test step 744 which determines if there is space left in the buffer. If not, then processing is complete. Otherwise, control passes from the test step 744 to a test step 746 which determines if the current field (i.e., the field that is pointed to by the pointer) is a scalar. If not, then control passes from the test step 746 to a test step 748 which determines if the field being pointed to is an array.

If it is determined at the test step 748 that the field being pointed to is an array, then control passes from the step 748 to a step 750 where additional space for the array is allocated. Allocating additional space for the array at the step 750 may include, for example, allocating enough space to store the values of each element of the array.

If it is determined at the test step 748 that the current field is not an array, then control passes from the step 748 to the step 752 where additional space for an object is allocated. Note that the step 752 is reached if the field being pointed to is an object because of the combination of the test steps 746, 748 causes the control to flow elsewhere if the field being pointed to is either a scalar or an array. At the step 752, the object allocation routine of FIG. 25 is called. That is, the step 752 represents a recursive call to the space allocation routine illustrated by the flow chart 710 of FIG. 25. Following either the step 750 or the step 752 is a step 754 where the pointer is incremented to point to the next field. Note that the step 754 is also reached if it is determined at the test step 746 that the field being pointed to is a scalar. This is because, if the field is a scalar, there is no additional processing needed for the field in the second pass since all of the space for the scalar was allocated at the step 726 of FIG. 26. Following step 754, control passes back to the step 744 to process the next field.

Figure 28:
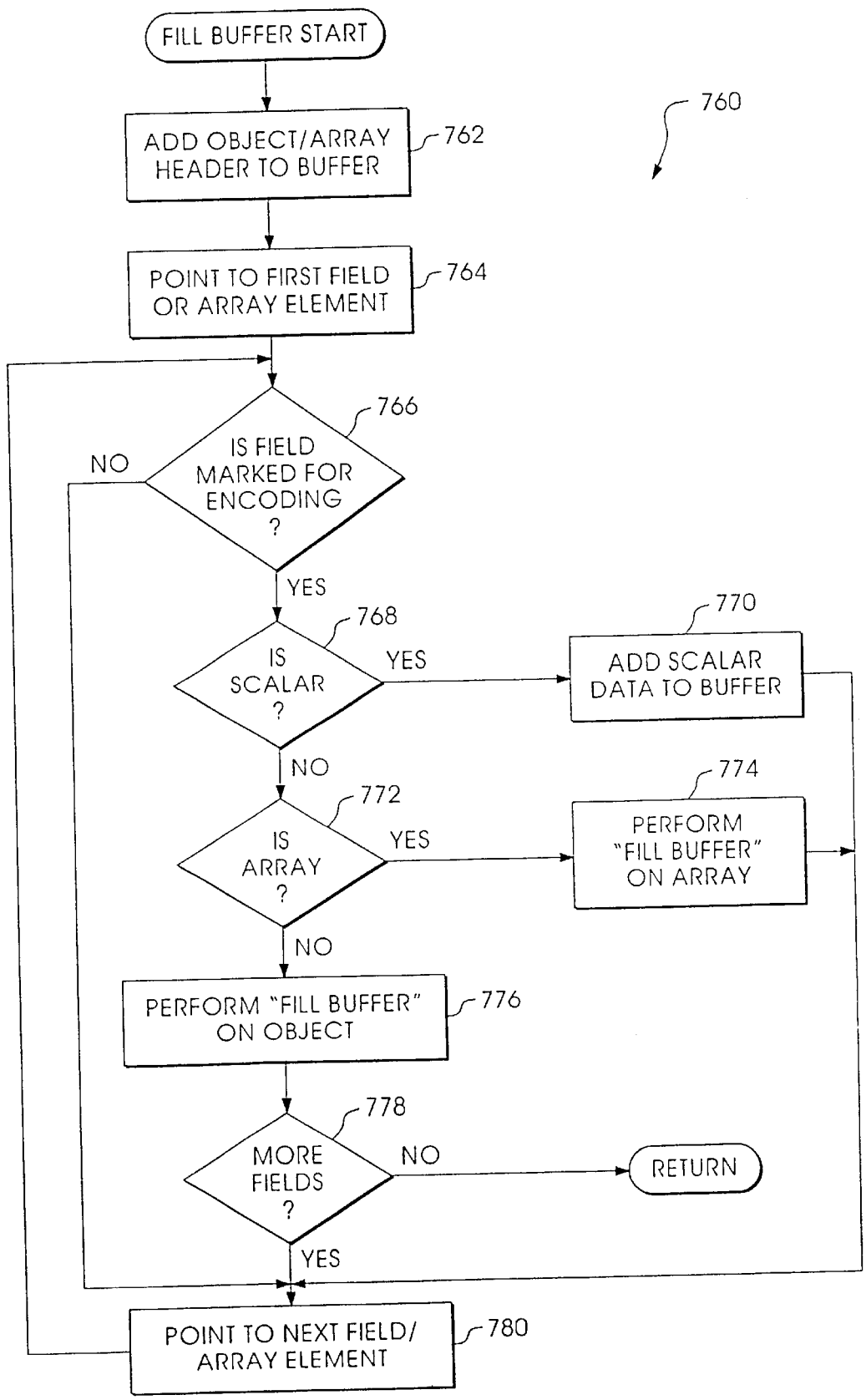
FIG. 28 is a flowchart illustrating in more detail a portion of the flowchart of FIG. 24.

Referring to FIG. 28, a flow chart 760 illustrates the fill buffer step 704 of FIG. 24. Processing begins at a first step 762 where the object/array header is added to the message buffer. Following the step 762 is a step 764 where a pointer is set to point to the first field or array element. Following the step 764 is a test step 766 where it is determined if the field being pointed to is marked for encoding. If so, then control passes from the step 766 to a step 768 where it is determined if the field being pointed to is a scalar.

If it is determined at the test step 768 that the field being pointed to is a scalar, then control passes from the step 768 to a step 770 where the scalar is added to the buffer. If it is determined at the test step 768 that the field being pointed to is not a scalar, then control passes from the test step 768 to a test step 772 where it is determined if the field being pointed to is an array. If so, then control passes from the test step 772 to a step 774 where the fill buffer routine, illustrated by the flow charts 760 is recursively called for the array element.

If it is determined at the test step 772 that the current pointer does not point to an array, then control passes from the test step 772 to a step 776 where the fill buffer routine is performed on the object that the pointer points to. Note that, the step 776 is reached only if the field being pointed to is an object. Following the step 776 is a test step 778 which determines if there are more fields to be processed. If not, then processing is complete. Otherwise, control passes from the test step 778 to a step 780 where the pointer is set to point to the next field. Note that the step 780 is also reached if it is determined at the test step 776 that the field being processed is not marked for encoding. The step 780 is also reached after the steps 770, 774. Following the step 780, processing loops back to the test step 766 in order to process the next field.

Note that the data that is passed via the message stream may be viewed and/or additionally processed in any one of a variety of conventional fashions, including using an appropriate graphical user interface to display various parameters, function calls, and other values that are passed via instrumentation. It is also possible to first store all of the passed data in the message data storage 417 and then display the data at a later time using either the analyzers/viewers 416 or other appropriate software. Another possibility is to simply display, using conventional text display and/or printing, alphanumerical values corresponding to the data stream.

It is also noted that the description of what is instrumented, set forth above, may be appropriate for debugging byte code. Instrumenting in a slightly different fashion may be appropriate when, for example, performance and/or code coverage measurements are being performed. In that case, as each class is opened for instrumentation, each class and methods therefore may be registered with the runtime instrumentation code. In the registration, information such as the name of the class, name of the methods, and the line numbers of each method, may recorded.

In the case of performance measurement, the instrumentation inserts a call to a runtime function that determines a current timestamp and that is associated with a corresponding line number. Then the timestamp for the previous line number is subtracted from the current timestamp. Hence, it is possible to calculate a duration value for each line.

In the case of instrumenting for code coverage, the instrumentation code and the runtime code may work together in a conventional fashion to denote each line in the program as being in one of three states: Non-executable, executable but not executed, and executed. To accomplish this, a call to a special runtime function is inserted in the prolog of each function. The special runtime function, among other things, uses the registered information for this method, to record each line number in the instrumented function. Then, a call to another runtime function is inserted for each line. The other runtime function indicates that the program source line corresponding thereto has been executed. As the instrumented program executes, each executable line is marked as actually executed. Hence, after the conclusion of the program, the executable line numbers that are not marked as executed are marked as executable but not executed. All other non-executed lines of the method are marked as non-executable. Using this technique, coverage information by class, by method, and by line, is collected.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A computer program product for instrumenting an initial byte code computer program, comprising:
   machine executable code that examines the initial byte code to determine an identifier associated with at least one block of code included in the initial byte code;
   machine executable code that selects portions of the initial byte code for instrumentation; and
   machine executable code that instruments, while loading the initial byte code, the portions by supplementing the initial byte code with additional byte code for instrumentation that facilitates runtime data gathering to monitor execution of the computer program, wherein a portion of the additional byte code uses the identifier to instrument portions of the initial byte code associated with said at least one block of code.

2. The computer program product of claim 1, wherein said machine executable code that selects portions includes machine executable code that:

selects portions of the initial byte code corresponding to at least one of: method entry, method exit, a throw, a method call, a new line number.

3. The computer program product of claim 2, wherein said machine executable code that instruments a portion of the initial byte code corresponding to a method call includes machine executable code that:

instruments a local line number of source code corresponding to the initial byte code being instrumented.

4. The computer program product of claim 1, wherein said machine executable code that instruments portions includes machine executable code that:

adds calls to instrumentation runtime functions that pass parameters indicative of portions being instrumented.

5. The computer program product of claim 4, wherein at least one of the parameters that is passed includes a line number of source code corresponding to the portion being instrumented.

6. The computer program product of claim 4, wherein at least one of the parameters that is passed includes a this pointer for a method corresponding to the portion being instrumented.

7. The computer program product of claim 4, wherein at least one of the parameters that is passed corresponds to at least one method parameter provided to a method containing byte code that is instrumented.

8. The computer program product of claim 7, further comprising:

machine executable code that passes data indicative of the at least one method parameter in a message buffer from an instrumentation runtime function to at least one viewer routine that displays the data to a user.

9. The computer program product of claim 8, wherein the message buffer includes scalar data, array data, and object data.

10. The computer program product of claim 9, further comprising:

machine executable code that places an object header in the message buffer; and machine executable code that places an array header in the message buffer.

11. The computer program product of claim 10, further comprising:

machine executable code that limits the message buffer to a predetermined size.

12. The computer program product of claim 4, further comprising:

machine executable code that stores data indicative of the parameters in a message buffer.

13. The computer program product of claim 12, further comprising:

machine executable code that passes data from the message buffer to at least one viewer routine that displays the data to a user.

14. The computer program product of claim 1, further comprising:

machine executable code that instruments an end of a method to provide instrumentation for handling an abort.

15. The computer program product of claim 1, further comprising:

machine executable code that instruments a call to a native function by adding a byte code wrapper to the native function and then instrumenting the wrapper.

16. The computer program product of claim 15, wherein the wrapper includes byte code corresponding to method entry and exit portions.

17. The computer program product of claim 1, further comprising:

machine executable code that instruments a call to a native function by providing a native assembly language thunk that captures data passed to and from the native function.

18. The computer program product of claim 17, further comprising:

machine executable code that hooks the assembly language thunk between a virtual machine and the call to the native function.

19. The computer program product of claim 18, wherein said machine executable code that hooks the assembly language thunk further includes:

machine executable code that intercepts a call that provides an address for a procedure.

20. The computer program product of claim 1, further comprising:

machine executable code that provides a routine to pass data via a message stream.

21. The computer program product of claim 20, further comprising:

machine executable code that provides a data storage to store data provided via the message stream.

22. The computer program product of claim 20, further comprising:

machine executable code that provides a viewer to allow viewing at least a subset of data from the message stream as the data is being generated.

23. A computer program product for instrumenting a computer program, comprising:

machine executable code that examines an initial byte code representation of the program to determine an identifier associated with at least one block of code included in the initial byte code;

machine executable code that creates a program counter mapping table corresponding to the initial byte code representation;

machine executable code that selects portions of the initial byte code representation for instrumenting using the program counter mapping table;

machine executable code that instruments, while loading the initial byte code representation, the portions by supplementing the initial byte code representation with calls byte code to instrumentation runtime functions at at least some of the portions to facilitate runtime data gathering for monitoring execution of the computer program, wherein a portion of the calls byte code uses the identifier to instrument portions of the initial byte code representation associated with said at least one block of code; and machine executable code that modifies the program counter mapping table according to original byte code and supplemented byte code.

24. The computer program product of claim 23, wherein said machine executable code that selects portions includes:

machine executable code that selects portions of the initial byte code representation corresponding to at least one of: method entry, method exit, a throw, a method call, and a new line number.

25. The computer program product of claim 23, wherein said machine executable code that instruments the portions includes:

machine executable code that adds calls to instrumentation runtime functions that pass parameters indicative of the portions being instrumented.

26. The computer program product of claim 23, further comprising:

machine executable code that instruments a call to a native function by adding a byte code wrapper to the native function and then instrumenting the wrapper.

27. The computer program product of claim 26, wherein the wrapper includes byte code instrumentation corresponding to method entry and exit portions.

28. The computer program product of claim 23, further comprising:

machine executable code that instruments a call to a native function by providing a native assembly language thunk that captures data passed to and from the native function.

29. The computer program product of claim 28, further comprising:

machine executable code that hooks the assembly language thunk between a virtual machine and the call to the native function.

30. The computer program product of claim 29, wherein said machine executable code that hooks the assembly language thunk includes:

machine executable code that intercepts a call that provides an address for a procedure.

31. The computer program product of claim 23, further comprising:

machine executable code that, following examining an initial byte code representation of the program, registers each of the methods and corresponding line numbers thereof with runtime instrumentation code.

32. The computer program product of claim 31, wherein each of the methods and corresponding line numbers thereof facilitates determining source code being executed during run time debugging.

33. An apparatus for instrumenting an initial byte code computer program, comprising:

means for examining the initial byte code to determine an identifier associated with at least one block of code included in the initial byte code;

means for selecting portions of the initial byte code for instrumentation; and means for instrumenting, while loading the initial byte code, the portions by supplementing the initial byte code with additional byte code for instrumentation that facilitates runtime data gathering to monitor execution of the computer program, wherein a portion of the additional byte code uses the identifier to instrument portions of the initial byte code associated with said at least one block of code.

34. The apparatus of claim 33, wherein said means for selecting portions includes:

means for selecting portions of the initial byte code corresponding to at least one of: method entry, method exit, a throw, a method call, and a new line number.

35. The apparatus of claim 34, wherein said means for instrumenting a portion of the initial byte code corresponding to a method call includes:

means for instrumenting a local line number of source code corresponding to the initial byte code being instrumented.

36. The apparatus of claim 33, wherein said means for instrumenting portions includes:

means for adding calls to instrumentation runtime functions that pass parameters indicative of portions being instrumented.

37. The apparatus of claim 36, wherein at least one of the parameters that is passed includes a line number of source code corresponding to the portion being instrumented.

38. An apparatus for instrumenting a computer program, comprising:

means for examining examines an initial byte code representation of the program to determine an identifier associated with at least one block of code included in the initial byte code;

means for creating a program counter mapping table corresponding to the initial byte code representation;

means for selecting portions of the initial byte code representation for instrumenting using the program counter mapping table;

means for instrumenting, while loading the initial byte code representation, the portions by supplementing the initial byte code representation with calls byte code to instrumentation runtime functions at at least some of the portions to facilitate runtime data gathering for monitoring execution of the computer program, wherein a portion of the calls byte code uses the identifier to instrument portions of the initial byte code representation associated with said at least one block of code; and means for modifying the program counter mapping table according to original byte code and supplemented byte code.

39. The apparatus of claim 38, wherein said means for selecting portions further includes:

means for selecting portions of the initial byte code intermediate representation corresponding to at least one of: method entry, method exit, a throw, a method call, and a new line number.

40. The apparatus of claim 38, wherein said means for instrumenting the portions includes:

means for adding calls to instrumentation runtime functions that pass parameters indicative of the portions being instrumented.

41. The apparatus of claim 38, further comprising:

means for instrumenting a call to a native function by adding a byte code wrapper to the native function and then instrumenting the wrapper.

* * * * *